(12) United States Patent
Stroble

(10) Patent No.: US 11,694,138 B2
(45) Date of Patent: Jul. 4, 2023

(54) LOG SCALING SYSTEM AND RELATED METHODS

(71) Applicant: Datalog, LLC, Seattle, WA (US)

(72) Inventor: David Stroble, Seattle, WA (US)

( * ) Notice: Subject to any disclaimer, the term of this patent is extended or adjusted under 35 U.S.C. 154(b) by 0 days.

(21) Appl. No.: 17/862,233

(22) Filed: Jul. 11, 2022

(65) Prior Publication Data

US 2022/0351401 A1    Nov. 3, 2022

Related U.S. Application Data

(63) Continuation of application No. 17/073,188, filed on Oct. 16, 2020, now Pat. No. 11,393,120, which is a
(Continued)

(51) Int. Cl.
*H04N 9/47* (2006.01)
*H04N 7/18* (2006.01)
(Continued)

(52) U.S. Cl.
CPC ... *G06Q 10/06315* (2013.01); *G06F 18/2431* (2023.01); *G06Q 50/02* (2013.01);
(Continued)

(58) Field of Classification Search
USPC ......... 348/61, 135, 136, 137, 140, 141, 142, 348/143, 159
See application file for complete search history.

(56) References Cited

U.S. PATENT DOCUMENTS 4,913,551 A * 4/1990 Davis ............... G01B 11/00
356/627
5,394,342 A    2/1995 Poon
(Continued)

FOREIGN PATENT DOCUMENTS

CN    101183206 A    5/2008
CN    101281021 A    10/2008
(Continued)

OTHER PUBLICATIONS

Akindele, et al., "Development of tree volume equations for common timber species in the tropical rain forest area of Nigeria", *Forest Ecology and Management*, vol. 226(1-3), May 2006, pp. 41-48.
(Continued)

*Primary Examiner* — Daquan Zhao
(74) *Attorney, Agent, or Firm* — Seed Intellectual Property Law Group LLP

(57) ABSTRACT

An automated log scaling system and associated methods are disclosed. In the system and methods, one or more imagers may capture depictions of respective first ends and/or second ends of a plurality of logs, and use the captured depictions to scale the plurality of logs. A diameter value for each end of the log may be determined using the captured depictions. Relative location values for each captured end may be determined and used to form a length of each log. Information captured in the images is used to identify the type of tree or species of tree for each log. At least one of the diameter values may be multiplied by the determined log length, and the resulting product value may be compared to values in a log scaling chart to determine a value for the log. The value of multiple logs may be used to form a load of logs for distribution.

20 Claims, 13 Drawing Sheets

Related U.S. Application Data continuation of application No. 16/746,719, filed on Jan. 17, 2020, now Pat. No. 10,825,192, which is a continuation of application No. 16/569,595, filed on Sep. 12, 2019, now Pat. No. 10,586,347.

(60) Provisional application No. 62/732,433, filed on Sep. 17, 2018.

(51) Int. Cl.

| | | |
|---|---|---|
| *G06Q 10/0631* | (2023.01) | |
| *G06T 7/62* | (2017.01) | |
| *G06Q 50/02* | (2012.01) | |
| *G06T 7/00* | (2017.01) | |
| *G06T 7/70* | (2017.01) | |
| *G06F 18/2431* | (2023.01) | |
| *H04N 23/54* | (2023.01) | |
| *H04N 23/90* | (2023.01) | |
| *G06V 10/20* | (2022.01) | |
| *H04N 9/44* | (2006.01) | |
| *G01B 11/08* | (2006.01) | |
| *G01S 17/08* | (2006.01) | |
| *H04L 12/28* | (2006.01) | |

(52) U.S. Cl.
CPC ............... *G06T 7/62* (2017.01); *G06T 7/70* (2017.01); *G06T 7/97* (2017.01); *G06V 10/255* (2022.01); *H04N 23/54* (2023.01); *H04N 23/90* (2023.01); *G01S 17/08* (2013.01); *G06T 2207/10012* (2013.01); *G06T 2207/30252* (2013.01); *H04L 12/28* (2013.01)

(56) References Cited

U.S. PATENT DOCUMENTS

| | | | |
|---|---|---|---|
| 6,041,173 A | 3/2000 | Howard | |
| 7,567,889 B2 | 7/2009 | Wismüller | |
| 7,574,409 B2 | 8/2009 | Patinkin | |
| 7,660,433 B2* | 2/2010 | Dralle | G01B 11/00 356/625 |
| 8,253,793 B2 | 8/2012 | Hiraoka | |
| 9,147,014 B2 | 9/2015 | Lastra | |
| 9,704,054 B1 | 7/2017 | Tappen et al. | |
| 9,798,956 B2 | 10/2017 | Jiang et al. | |
| 10,503,943 B2* | 12/2019 | Alwesh | B07C 5/14 |
| 2004/0112466 A1 | 6/2004 | Roth et al. | |
| 2007/0140684 A1 | 6/2007 | Tsang | |
| 2007/0286474 A1 | 12/2007 | Dralle | |
| 2008/0306702 A1 | 12/2008 | Stone et al. | |
| 2009/0172960 A1 | 7/2009 | Meunier et al. | |
| 2009/0303497 A1 | 12/2009 | Hämäläinen | |
| 2009/0323121 A1 | 12/2009 | Valkenburg et al. | |
| 2015/0317589 A1 | 11/2015 | Anderson et al. | |
| 2016/0110442 A1 | 4/2016 | Williams et al. | |
| 2017/0235983 A1 | 8/2017 | Alwesh et al. | |
| 2017/0371886 A1 | 12/2017 | Chen et al. | |

FOREIGN PATENT DOCUMENTS

| | | |
|---|---|---|
| CN | 201233223 Y | 5/2009 |
| CN | 201269745 Y | 7/2009 |
| CN | 101950381 A | 1/2011 |
| CN | 202339579 U | 7/2012 |
| CN | 102870135 A | 1/2013 |
| CN | 103106279 A | 5/2013 |
| CN | 203054880 U | 7/2013 |
| CN | 103449154 A | 12/2013 |
| CN | 103679613 A | 3/2014 |
| CN | 102928514 B | 12/2014 |
| CN | 105241423 A | 1/2016 |
| CN | 106326846 A | 1/2017 |
| CN | 106485708 A | 3/2017 |
| CN | 107111602 A | 8/2017 |
| CN | 108050944 A | 5/2018 |
| JP | 03-502835 A | 6/1991 |
| JP | 9-281581 A | 10/1997 |
| JP | 2003-502679 A | 1/2003 |
| JP | 5538223 B2 | 7/2014 |
| JP | 2017-527057 A | 9/2017 |
| JP | 2021-6997 A | 1/2021 |
| WO | 00/79213 A1 | 12/2000 |
| WO | 2010/008074 A1 | 1/2010 |
| WO | 2011/065814 A1 | 6/2011 |
| WO | 2017/114977 A1 | 7/2017 |

OTHER PUBLICATIONS

Holmgren, et al., "Identifying species of individual trees using airborne laser scanner", *Remote Sensing of Environment*, vol. 90(4), Apr. 2004, pp. 415-423.

Maclean, et al., "Gross-Merchantable Timber Volume Estimation Using an Airborne Lidar System", *Canadian Journal of Remote Sensing*, vol. 12(1), 1986, pp. 7-18.

Plotkin, et al., "Cluster Analysis of Spatial Patterns in Malaysian Tree Species", *The American Naturalist*, vol. 160(5), Nov. 2002, pp. 629-644.

Tan, et al., "Chapter 8: Cluster Analysis: Basic Concepts and Algorithms", *Introduction to Data Mining*, Second Edition, 2019, pp. 487-568, retrieved from < https://www-users.cs.umn.edu/~kumar001/dmbook/index.php>.

* cited by examiner

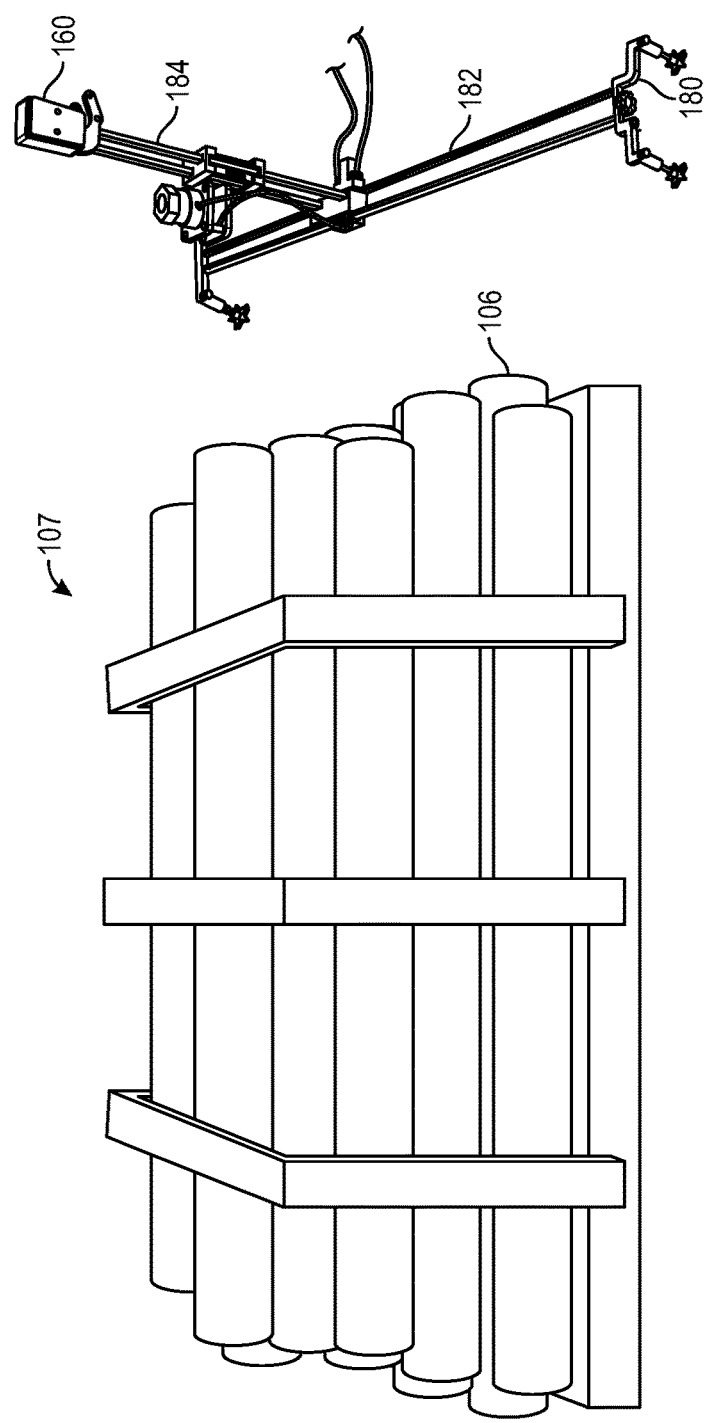
FIG. 1D
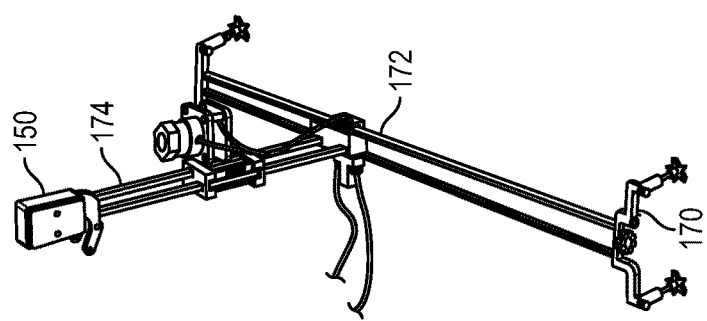

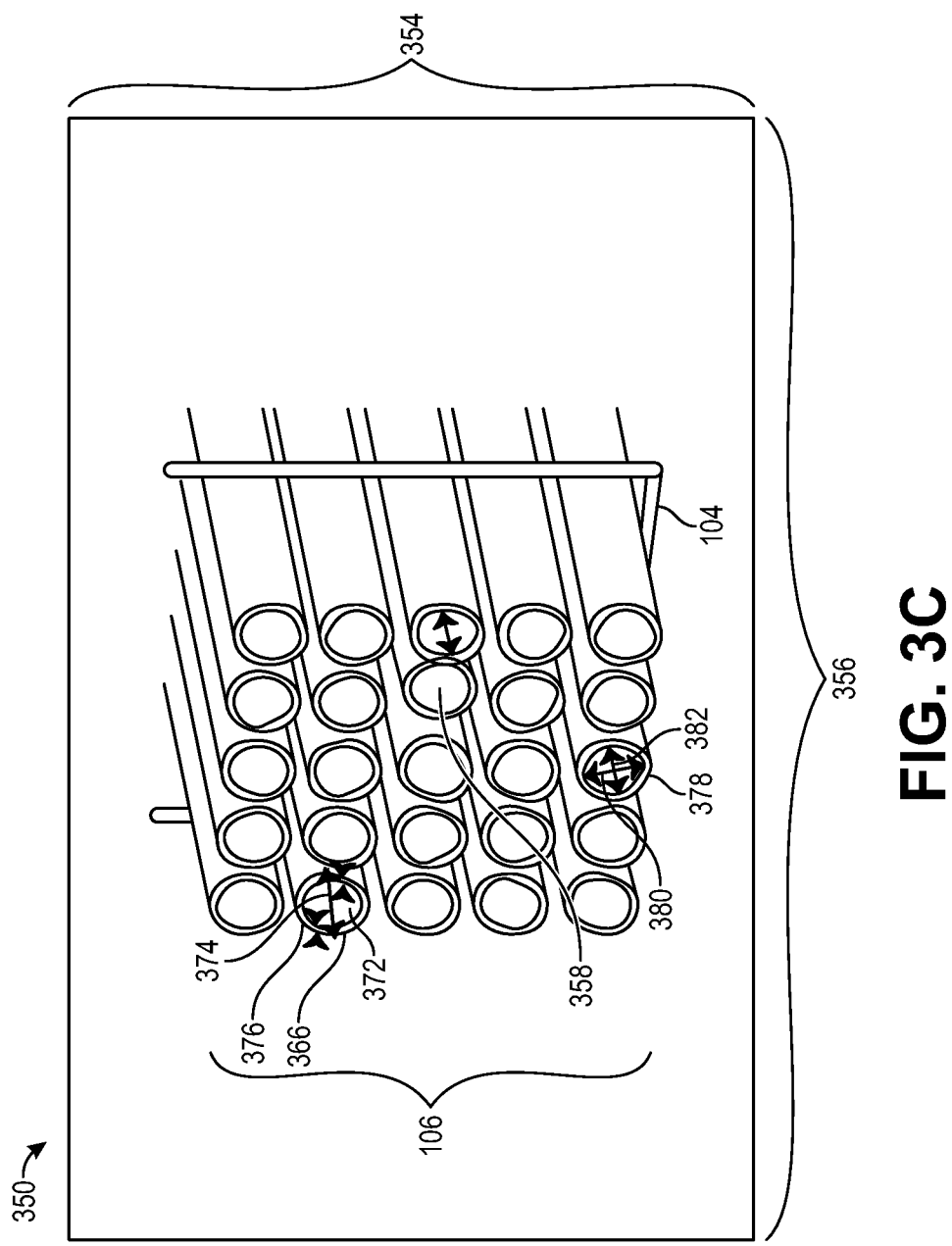

LOG SCALING SYSTEM AND RELATED METHODS

TECHNICAL FIELD

The present disclosure generally relates to log scaling systems and, more particularly, new automated log scaling systems and associated methods.

BACKGROUND

Description of the Related Art

Log scaling provides important information for the sale and distribution of logs by detailing the amount of usable lumber a log can provide by assigning a value to the log. Unfortunately, prior art log scaling techniques are more cumbersome, more time consuming, and less accurate than desired. This information can facilitate the distribution of logs to lumber mills and other producers who take in logs in order to produce lumber materials and/or finished wood products. By determining the amount of usable lumber a log may contain, a sufficient number of logs may be shipped to each producer to meet the needs of the producer without supplying the producer with too many logs for their needs.

Traditionally, log scaling has occurred at some point proximate to where the log is harvested. In some instances, log scaling may occur in the field at the point where the log is harvested, but doing so is expensive and could impact the speed at which harvested logs are shipped. In other instances, logs may be scaled at a central location that is proximate either to a number of harvesting locations and/or along a shipping route between the harvesting locations and a distribution or shipping point for logs. In such a situation, specialty trailers (e.g., truck, train, ship, or the like) may haul a load of logs to the central scaling location and dump the logs at that location to be scaled at some later point in time, allowing the transporter to proceed to picking up another load of logs.

Log scaling has traditionally been a labor intensive process that tries to provide a value for the "board-feet" of each the log. Log harvesters, lumber mills, and others in the logging and lumber industry may use the board-feet value to determine the amount of usable lumber that a log may provide. The logs may then be formed into a load that may be distributed to lumber mills and other purchasers to fulfill purchase orders for a particular amount of lumber. The traditional process, whether carried out at the harvesting location, at a central log scaling facility, or at some other location, is time and labor intensive, and introduces a significant amount of overhead and delay in the shipment and distribution of logs.

There is a continuing need to provide a way to scale logs without time and labor intensity, and without the traditionally significant amounts of overhead and delay in the shipment and distribution of logs.

BRIEF SUMMARY

The following is a summary of the present disclosure in order to provide a basic understanding of some features and context. This summary is not intended to identify key or critical elements of the disclosure or to delineate the scope of the disclosure. Its sole purpose is to present some concepts of the present disclosure in simplified form as a prelude to a more detailed description that is presented later.

An automated system for determining the diameter and/or length of one or more logs may facilitate the quick distribution of logs to lumber mills and other purchasers. Such an automated system may be used to more quickly and efficiently form loads of logs that may be distributed to meet the needs of a plurality of purchasers. In addition, such an automated system may be used to quickly and efficiently distribute harvesting information to entities along a supply line between the harvesting of the log and the manufacture of a final product using the resulting lumber from the log. Such information may be provided almost instantaneously at a location close to where the log is harvested, and may thereby be used by entities along the supply chain to plan for the delivery and distribution of the logs and lumber products. Such an automated system may further be used for the more efficient distribution of logs to various producers and lumber mills.

A method to scale pluralities of logs loaded on one or more transport trailers, each log of the pluralities of logs having a first end and a second end separated by a length of the respective log, may be summarized as including for each of the one or more transport trailers, capturing, by a first imager, a first image of the plurality of logs, the first image including a depiction of the first end of each log of the plurality of logs; capturing, by a second imager, a second image of the plurality of logs, the second image including a depiction of the second end of each log of the plurality of logs; and with at least one processor: generating a load identifier for each load of logs on a respective one of the one or more transport trailers; generating a log identifier for each log of the plurality of logs; determining a first diameter value for the first end of each log based upon the depiction of the first end of each respective log in the first image; determining a second diameter value for the second end of each log based upon the depiction of the second end of each respective log in the second image; determining, based at least in part upon one of the first and second diameter values, a product value for each log of the plurality of logs in each of the one or more transport trailers; storing, in a database, the first and second images associated with each of the one or more transport trailers, the load identifier for each load of logs, the log identifier for each log of the plurality of logs, the first and second diameter values associated with each log of the plurality of logs in each of the one or more transport trailers, and the product value for each log of the plurality of logs in each of the one or more transport trailers; accumulating a plurality of product values to form a load of logs for distribution; and grouping a plurality of identifiers to form a distribution load, the plurality of identifiers drawn from the log identifiers and load identifiers stored in the database, the distribution load representing an accumulation of product values within a determined acceptable range of a targeted total product value.

The method may further include determining, by the at least one processor, a length value for at least one log, wherein determining the product value for the at least one log is based at least in part upon at least one of the determined first and second diameter values and upon the determined length value of the at least one log.

The method may further include capturing, by a second imager, a second image of the plurality of logs, the second image including a depiction of the second end of the at least one log in the plurality of logs, wherein determining the length value further includes determining the length value for the at least one log based at least upon the first image and the second image.

The method may further include transmitting a first signal towards the first end of the plurality of logs; receiving a first reflected signal resulting from a reflection of the first signal off of the first end of the at least one log; determining, by the at least one processor, a first location value for the first end of the at least one log; transmitting a second signal towards the second end of the plurality of logs; receiving a second reflected signal resulting from a reflection of the second signal off of the second end of the at least one log; and determining, by the at least one processor, a second location value for the second end of the at least one log, wherein determining the length value of the at least one log is based at least in part on the first location value and the second location value.

The method may further include receiving a first signal that includes a first identifier, the first identifier which is associated with the at least one log, wherein generating the log identifier for each log of the plurality of logs is based at least in part upon the first identifier; storing, by the at least one processor, a first data record on a computer readable medium, the first data record that includes at least the first identifier and the determined product value for the at least one log; and transmitting a second signal that includes the first data record.

Receiving the first signal may further include receiving a first wireless signal transmitted from a first wireless tag that is physically coupled to the at least one log, the first wireless signal encoding the first identifier.

Receiving the first signal may further include receiving one or more signals representative of an image-based machine-readable symbol that appears on the at least one log and encodes the first identifier associated with the at least one log.

The at least one log may be comprised of a lumber component and an outer bark component, and determining the diameter value for the at least one log may further include determining a total width value for the at least one log; determining a bark width value for the at least one log using the at least first image, the bark width value which is based on the outer bark component; and determining the diameter value for the at least one log based at least in part on the total width value and the bark width value for the at least one log.

The method may further include receiving a tree-type information related to the at least one log, the tree-type information identifying one out of a plurality of types of trees, wherein determining the product value for the at least one log is further based upon the tree-type information.

A log scaling system to scale a plurality of logs that are arranged within a transport trailer, each log within the plurality of logs including a first end and a second end separated by a length of the respective log, may be summarized as including a first imager that captures a first image, the first image which depicts the first end of at least one log in the plurality of logs; at least one processor; and at least one nontransitory processor-readable storage device communicatively coupled to the at least one processor and that stores processor-executable instructions which, when executed by the at least one processor, cause the at least one processor to: determine a diameter value for the at least one log based upon the depiction of the first end of the at least one log in the first image; and determine, based at least in part upon the diameter value, a product value for the at least one log.

The log scaling system may further include a second imager that captures a second image, the second image which depicts the second end of the at least one log in the plurality of logs, wherein the at least one nontransitory processor-readable storage device stores processor-executable instructions which, when executed by the at least one processor, cause the at least one processor to further determine a length value for the at least one log based upon the first image and the second image, and determine the product value for the at least one log based at least in part upon the determined diameter value and the determined length value of the at least one log.

The log scaling system may further include a third imager that captures a third image, wherein the first image and the third image collectively provide at least one non-obstructed depiction of each first end for each log in the plurality of logs.

The log scaling system may further include a first range finder that generates a signal representative of a range between the first range finder and the first end of the at least one log in the plurality of logs, wherein the at least one nontransitory processor-readable storage device stores processor-executable instructions which, when executed by the at least one processor, cause the at least one processor to further receive the signal from the first range finder; and determine the diameter value for the at least one log based upon the depiction of the first end of the at least one log in the first image and based upon the received signal representative of the range between the first range finder and the first end of the at least one log.

The log scaling system may further include a second range finder that generates a signal representative of a range between the second range finder and the second end of the at least one log in the plurality of logs, wherein the at least one nontransitory processor-readable storage device stores processor-executable instructions which, when executed by the at least one processor, cause the at least one processor to further receive the signal from the second range finder; determine a first location value for the first end of the at least one log in the plurality of logs based upon the received signal from the first range finder; determine a second location value for the second end of the at least one log in the plurality of logs based upon the received signal from the second range finder; and determine a length value for the at least one log based upon the first location value and the second location value.

The at least one nontransitory processor-readable storage device may store processor-executable instructions which, when executed by the at least one processor, may cause the at least one processor to further determine the product value for the at least one log based at least in part upon the determined diameter value and the determined length value of the at least one log.

The log scaling system may further include a wireless receiver that receives a signal transmitted from a wireless transmitter that is physically coupled to the at least one log, wherein the transmitted signal encodes a first identifier for the at least one log, wherein the at least one nontransitory processor-readable storage device stores processor-executable instructions which, when executed by the at least one processor, cause the at least one processor to further store on the at least one nontransitory processor-readable storage device a first data record that includes at least the first identifier and the determined product value for the at least one log.

The at least one nontransitory processor-readable storage device may store processor-executable instructions which, when executed by the at least one processor, may cause the at least one processor to further store the first image of the plurality of logs as part of the first data record.

In some embodiments, the log scaling distribution system includes a log scaling system, a first display, at least one processor, and at least one non-transitory processor-readable storage device communicatively coupled to the at least one processor and that stores processor-executable instructions. The log scaling system scales a plurality of logs that are arranged within a transport trailer. The log scaling system includes a first imager that captures a first image. The first image depicts the first end of each log in the plurality of logs. The log scaling system determines a diameter value for each of the logs based upon the depiction of the first end of each log in the first image. When executed by the at least one processor, the processor-executable instructions cause the at least one processor to: determine a first value for each of the plurality of logs, the first value which is based at least in part upon the diameter value for each log and which is in a first log rule standard; and transmit an aggregate value to be depicted on the first display, the aggregate value which is based upon the first values determined for each of the plurality of logs.

In another aspect of some embodiments, the log scaling distribution system further includes a second display which is located remotely from the first display and which transmits a first message that includes an order for a load of logs, the order including an order value based upon at least one of the first log rule standard or a second log rule standard, the second display which receives a second message that includes a purchase value for the ordered load of logs. In still another aspect of some embodiments of the log scaling distribution system, the at least one processor receives the order for the load of logs in which the order value is based upon the second log rule standard. The at least one processor further executes processor-executable instructions that cause the at least one processor to: convert the order value from the second log rule standard to a converted order value that is based upon the first log rule standard; identify one or more logs from the plurality of logs scaled by the log scaling system based upon the converted order value; and determine the purchase value for the order based at least in part upon the first values determined for each log in the identified one or more logs.

In yet another aspect of some embodiments of the log scaling distribution system, the purchase value is depicted on the first display and on the second display. The at least one processor executes processor-executable instructions that cause the at least one processor to: receive a first acceptance message from the first display, the first acceptance message including an indication from a logging entity agreeing to the purchase value; receive a second acceptance message from the second display, the second acceptance message including an indication from a purchasing entity agreeing to the purchase value; and in response to receiving the first acceptance message and the second acceptance message, transmit an order fulfillment message that causes the identified one or more logs to be grouped into a distribution load of logs.

In another aspect of some embodiments of the log scaling distribution system, each of the logs in the plurality of logs is associated with a log identifier. The log identifier is physically coupled the associated log, the log scaling distribution system further includes: a third terminal located remotely from the first terminal and the second terminal, the third terminal which receives the order fulfillment message, and in response, displays one or more log identifiers associated with one or more logs in the distribution load of logs.

In still another aspect of some embodiments of the log scaling distribution system, the at least one processor executes processor-executable instructions that cause the at least one processor to: associate a distribution load identifier with the distribution load of logs. In yet another aspect of some embodiments of the log scaling distribution system, the order fulfillment message further includes the distribution load identifier and a delivery location for the distribution load of logs, the log scaling distribution system further comprising: a fourth display, the fourth display associated with a transport trailer, the fourth display which depicts the delivery location for the distribution load of logs. In some embodiments of the log scaling distribution system, the order fulfillment message causes the identified one or more logs in the distribution load of logs to be loaded onto the transport trailer associated with the fourth display.

A log scaling system to scale a plurality of logs, each log within the plurality of logs including a first end and a second end separated by a length of the log may be summarized as including one or more sensors that capture at least a first image and a second image, the first image depicting the first end of at least one log in the plurality of logs, and the second image depicting the second end of at least one log in the plurality of logs; one or more processors; and one or more nontransitory processor-readable storage devices communicatively coupled to the one or more processors and that store processor-executable instructions which, when executed by the one or more processors, cause the one or more processors to: determine a first end diameter value for the at least one log based upon the depiction of the first end of the at least one log in the first image; determine a second end diameter value for the at least one log based upon the depiction of the second end of the at least one log in the second image; determine a length for the at least one log based at least in part on the first image and the second image of the at least one log; and determine, based at least in part upon the first end diameter value, the second end diameter value, and the length of the at least one log, a product value for the at least one log.

The one or more sensors may include at least a first end sensor and a second end sensor. The one or more sensors may be positioned on one or more mobile stands. The one or more mobile stands may include one or more vertical motorized sliders. The one or more mobile stands may include one or more horizontal motorized sliders. The one or more mobile stands may be one or more tripods. At least one of the one or more sensors may acquire Lidar data. At least one of the one or more sensors may acquire stereo data. The Lidar data and the stereo data may be fused by the log scaling system. Data from the first image depicting the first end of at least one log in the plurality of logs and data from the second image depicting the second end of at least one log in the plurality of logs may be used to detect log locations and determine a count of the logs. Data from the first image depicting the first end of at least one log in the plurality of logs and data from the second image depicting the second end of at least one log in the plurality of logs may be used to segment logs and measure the diameters of the logs. Data from the first image depicting the first end of at least one log in the plurality of logs and data from the second image depicting the second end of at least one log in the plurality of logs may be used match two ends of each log.

A log scaling method to scale a plurality of logs, each log within the plurality of logs including a first end and a second end separated by a length of the log may be summarized as including using one or more sensor systems to capture at least a first image and a second image, the first image depicting the first end of at least one log in the plurality of logs, the second image depicting the second end of at least one log in the plurality of logs, the one or more sensor systems each including one or more sensors, one or more processors, and one or more nontransitory processor-readable storage devices communicatively coupled to the one or more processors that store processor-executable instructions thereon; determining a first end diameter value for the at least one log based upon the depiction of the first end of the at least one log in the first image; determining a second end diameter value for the at least one log based upon the depiction of the second end of the at least one log in the second image; determining a length for the at least one log based at least in part on the first image and the second image of the at least one log; and calculating, based at least in part upon the first end diameter value, the second end diameter value, and the length of the at least one log, a product value for the at least one log.

The one or more sensor systems may include at least a first end sensor and a second end sensor. The one or more sensors may be positioned on one or more mobile stands. The one or more mobile stands may include one or more vertical motorized sliders. The one or more mobile stands may include one or more horizontal motorized sliders. The one or more mobile stands may be one or more tripods. At least one of the one or more sensors may acquire Lidar data. At least one of the one or more sensors may acquire stereo data. The Lidar data and the stereo data may be fused by the log scaling system.

The log scaling method may further include detecting log locations and determining a count of the logs using data from the first image depicting the first end of at least one log in the plurality of logs and data from the second image depicting the second end of at least one log in the plurality of logs.

The log scaling method may further include segmenting logs and measuring the diameters of the logs data from the first image depicting the first end of at least one log in the plurality of logs and data from the second image depicting the second end of at least one log in the plurality of logs.

The log scaling may further include matching two ends of each log using data from the first image depicting the first end of at least one log in the plurality of logs and data from the second image depicting the second end of at least one log in the plurality of logs.

These features, with other technological improvements that will become subsequently apparent, reside in the details of construction and operation as more fully described hereafter and claimed, reference being had to the accompanying drawings forming a part hereof.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are sized (e.g., enlarged, reduced, or otherwise changed) and positioned to improve drawing legibility. Further, the particular shapes of the elements as drawn, alone or in relationship to other elements, are not intended to convey any information regarding the actual shape of the particular elements, and have been solely selected for ease of recognition in the drawings.

FIG. 1D is a perspective view of a log scaling system in which a left 3D sensor is mounted on a stand with vertical and horizontal motorized sliders and a right 3D sensor is mounted on a stand with vertical and horizontal motorized sliders that are independently positionable around a stack of logs, according to at least one illustrated implementation.

FIG. 3C is a depiction of an image captured by an imager, in which the image provides a left side isometric view of a second end of a plurality of logs, according to at least one illustrated implementation.

DETAILED DESCRIPTION

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, certain structures associated with log scaling such as inspection/weighing points, trucks, trains, boats, transportation trailers, wired and wireless communications protocols, wired and wireless transceivers, radios, communications ports, geolocation, and optimized route mapping algorithms have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless the context requires otherwise, throughout the specification and claims which follow, the word "comprise" and variations thereof, such as, "comprises" and "comprising" are to be construed in an open, inclusive sense, that is as "including, but not limited to." As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. The headings and Abstract of the Disclosure provided herein are for convenience only and do not interpret the scope or meaning of the embodiments.

Figure 1A:
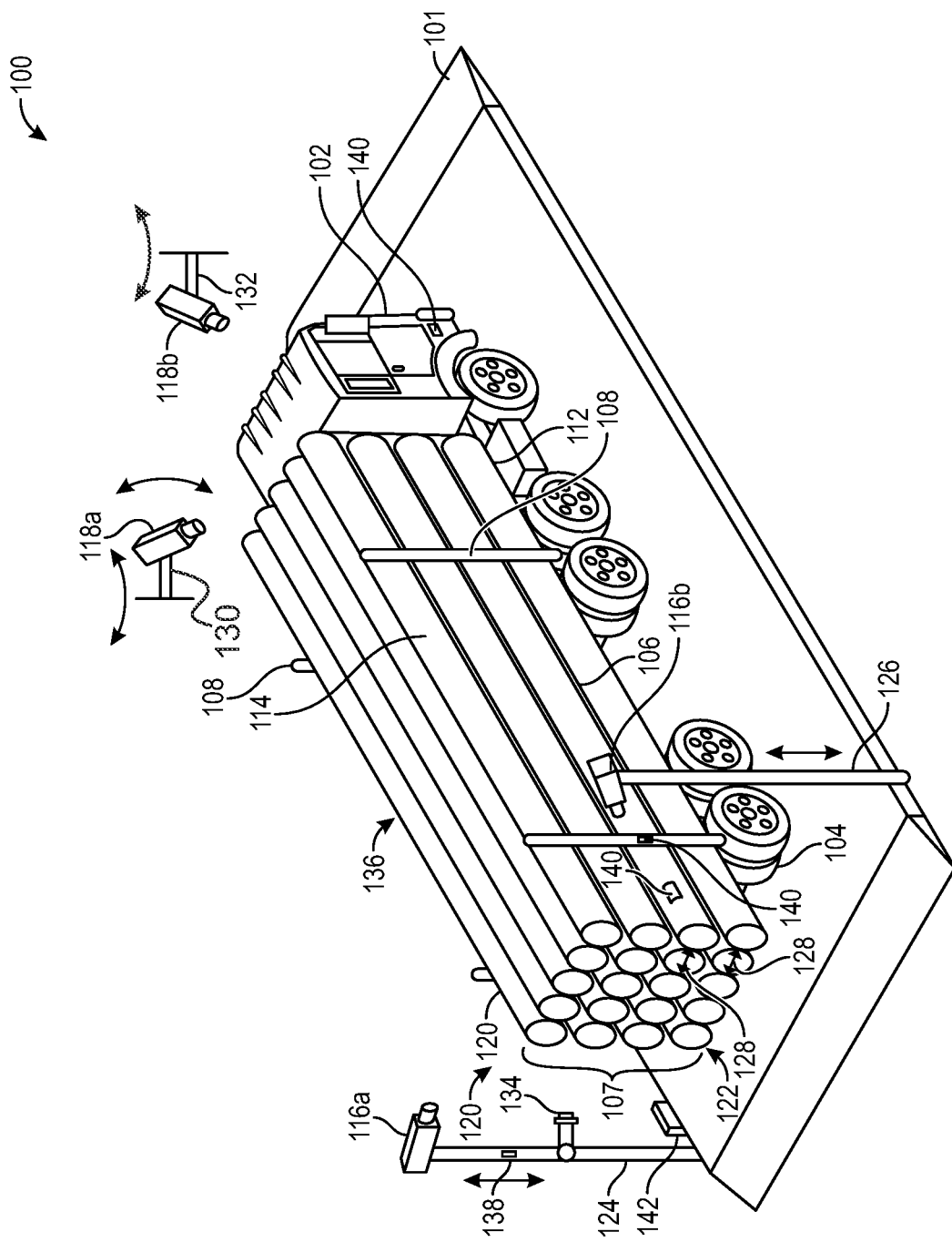
FIG. 1A is an isometric view of a log scaling system on which is positioned a truck and associated transport trailer, according to at least one illustrated implementation.

FIG. 1A shows a log scaling system 100 on which is positioned a truck 102 and associated transport trailer 104, according to at least one illustrated implementation. A plurality of logs 106 may be loaded on the transport trailer 104, which may be physically coupled to and pulled by the truck 102. The plurality of logs 106 may together form a load 107 of logs. The transport trailer 104 may be adapted to carry the load 107 of logs 106. For example, the transport trailer 104 may be comprised of a frame that includes two or more sets of opposing posts 108 that are set across the width of the truck in which each of the plurality of logs 106 is positioned between each set of opposing posts 108. Each of the plurality of logs 106 may include a first end 110 located distal the truck 102, and an opposing second end 112 located proximate the truck 102, in which the first end 110 and the second end 112 of each respective log 106 are separated by a length 114.

The plurality of logs 106 may be arranged within the transport trailer 104 in a plurality of rows and a plurality of columns as illustrated in FIG. 1A to simplify the illustration and associated discussion. The concepts described herein, however, are not so limited, and it is recognized that the plurality of logs 106 may be generally parallel, but not exactly parallel. For example, in some implementations, many of the logs may be askew. In some implementations, one or more of the logs 106 in the plurality of logs 106 may be de-limbed. In some implementations, one or more of the logs 106 in the plurality of logs may have an outer layer of bark that has not been removed from the one or more logs 106.

The log scaling system 100 may include a pad 101, one or more rear imagers 116a, 116b (collectively, "rear imagers 116"), and/or one or more forward imagers 118a, 118b (collectively, "forward imagers 118"). The pad 101 may be sized and dimensioned such that the truck 102 and trailer 104 may be selectively driven onto and/or off of the pad 101. In some implementations, the pad 101 may include one or more markings and/or structures that may be used to position the truck 102 and/or trailer 104 on the pad 101 so that the logs 106 may be scaled. In some implementations, the structure on the pad 101 may include, for example, a bump that the tires of the truck 102 and/or trailer 104 roll over. In some implementations, the pad 101 may be used to take further measurements of the truck 102 and/or trailer 104. Such further measurements may include, for example, a measurement of the weight of the items on the pad 101.

Figure 1B:
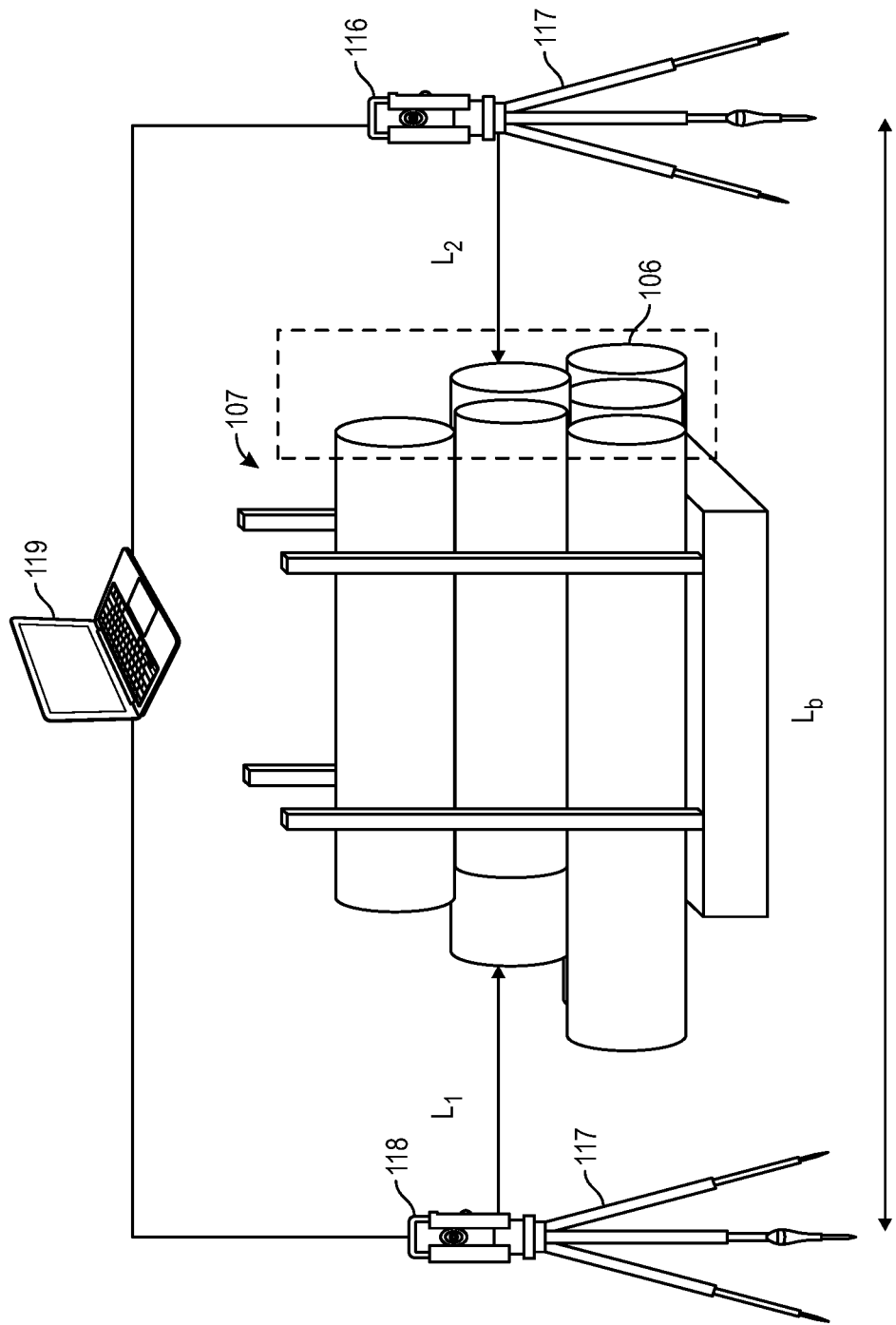
FIG. 1B is an isometric view of a log scaling system in which rear imagers and forward imagers are independently positionable on independent stands that are positioned around a stack of logs, according to at least one illustrated implementation.
Figure 1C:
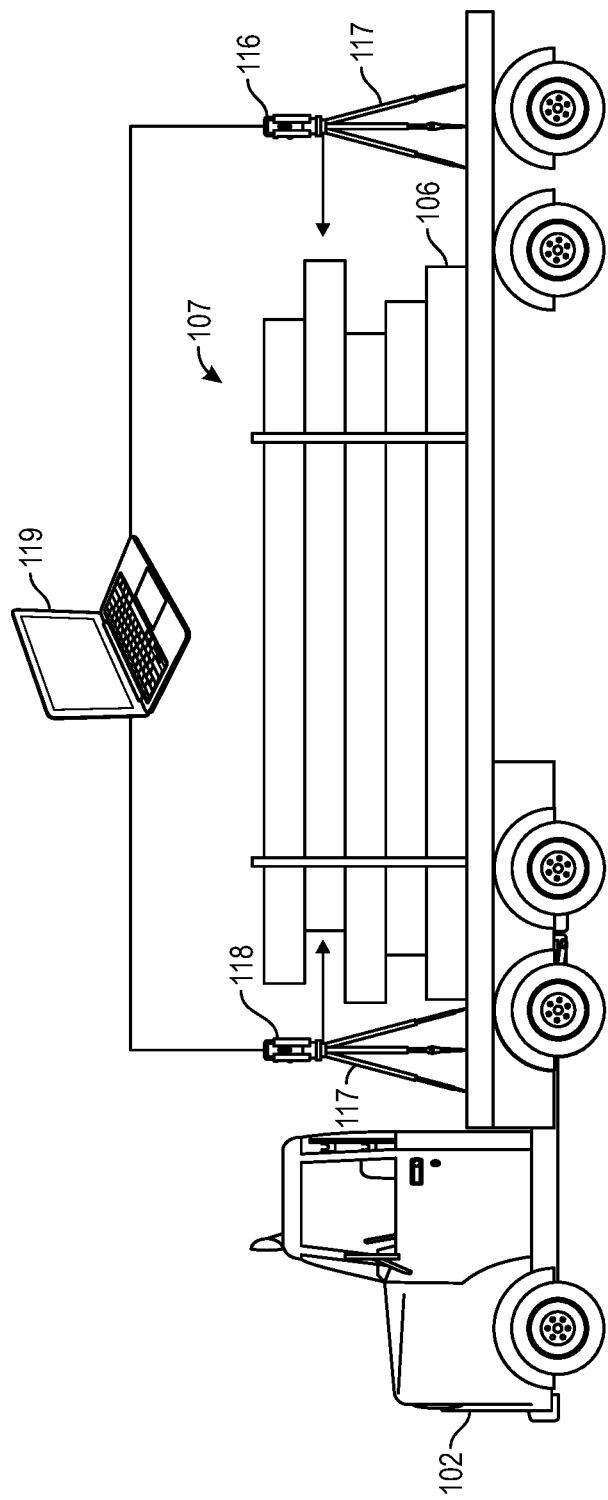
FIG. 1C is a side view of a log scaling system in which rear imagers and forward imagers are independently positionable on independent stands that are positioned around a stack of logs on the bed of a truck, according to at least one illustrated implementation.

Referring now to FIGS. 1B and 1C, some embodiments of the log scaling system 100 are mobile and do not include a pad 101. Instead, the rear imagers 116 and the forward imagers 118 are independently positionable or mountable on independent stands 117 or mounts that may be positioned around a stack of logs 106, as shown in FIG. 1B. In some such embodiments, the truck 102 does not have to drive onto or into the log scaling system 100, but rather the independently positionable rear imagers 116 and forward imagers 118 are positioned around the truck 102, as shown in FIG. 1C. In some embodiment, the rear imagers 116 and forward imagers 118 of the log scaling system 100 are positioned inside of a fixed structure, such as a building, roof structure, or tent. In other embodiments, the rear imagers 116 and forward imagers 118 of the log scaling system 100 are positioned outdoors. In some embodiments of the log scaling system 100 that incorporate independent stands 117 or mounts for the rear imagers 116 and forward imagers 118, the log scaling system 100 further incorporates an indexing system that calibrates the positions of the rear imagers 116 and forward imagers 118 with respect to one another. In other aspects of some implementations, other types of geolocation technology may be incorporated, such as GPS (Global Positioning Systems), satellites-based location determination systems, and the like. As shown in FIGS. 1B and 1C, in some embodiments the log scaling system 100 that are mobile, the independently positionable rear imagers 116 and forward imagers 118 are connected wirelessly to a computer 119 that processes the log scaling data after images have been taken and transmitting by the rear imagers 116 and forward imagers 118. In other embodiments, the independently positionable rear imagers 116 and forward imagers 118 have a wired connection to a computer 119 that processes the log scaling data after images have been taken and transmitting by the rear imagers 116 and forward imagers 118.

In other embodiments of the log scaling system 100, the imagers/sensors are independently positionable on mounts that incorporate extendable and retractable arms with one or more joints and rotation points that hold the imagers/sensors. In such embodiments, the mounts do not need to be moved between the scaling of different loads 107 of logs 106 since the extendable and retractable arms are able to move the imagers/sensors into proper position to obtain images and/or sensor readings for each consecutive load 107 of logs 106 without moving the mounts.

In another aspect of some embodiments, additional lights are included in the log scaling system 100 to enable the rear imagers 116 and forward imagers 118 of the log scaling system 100 to obtain clear readings of the one or more logs 106. The additional lights may be included in some embodiments of the log scaling system 100 that are inside of a fixed structure to overcome or alleviate poor or uneven artificial lighting conditions inside the fixed structure. Correspondingly, the additional lights may be included in some embodiments of the log scaling system 100 that are outside of any fixed structure to overcome or alleviate poor or uneven natural lighting conditions outside of any fixed structure. Furthermore, in some embodiments of the log scaling system 100 the imagers are three dimensional (3-D) sensors.

In still another aspect of some embodiments, the log scaling system 100 is mobile as opposed to fixed. In some embodiments of the log scaling system 100 that are mobile, the log scaling system 100 includes one or more power sources (e.g., batteries) as well as satellite, cellular, or other wireless connectivity. In some embodiments, a single independently positionable 3-D sensor on a stand 117 (e.g., a tripod stand, as shown in FIGS. 1B and 1C) may be moved to multiple positions around the stack of logs 106 so that only one or two independently positionable 3-D sensors are needed, instead of four or more fixed sensors or imagers.

Referring now to FIG. 1D, in yet another aspect of some embodiments, the mobile log scaling system 100 includes a first end 3D sensor 150 and a second end 3D sensor 160 that are each mounted to stands 170 and 180. Each stand has two motorized sliders (horizontal sliders 172 and 182, and vertical sliders 174 and 184) that move in both vertical directions and horizontal directions to capture any views of the logs from the vertical plane created by the stands 170 and 180 with the motorized sliders. Specifically, in one or more embodiments of the log scaling system 100, the first end 3D sensor 150 is operatively associated with a first end stand 170 having a horizontal motorized slider 172 that moves the first end 3D sensor 150 in a horizontal direction. Additionally, the first end 3D sensor 150 is also operatively associated with a vertical motorized slider 174 of the first end stand 170 that moves the first end 3D sensor 150 in a vertical direction. Correspondingly, in one or more embodiments of the log scaling system 100, the second end 3D sensor 160 is operatively associated with a second end stand 180 having a horizontal motorized slider 182 that moves the second end 3D sensor 160 in a horizontal direction. Additionally, the second end 3D sensor 160 is also operatively associated with a vertical motorized slider 184 that move that moves the second end 3D sensor 160 in a vertical direction.

The transport trailer 104 may be positioned along the log scaling system 100 such that the one or more rear imagers 116a may be positioned to capture images of the first end 110 of one or more logs 106 in the plurality of logs. For example, the left rear imager 116a may capture a depiction of the first end 110 of the plurality of logs 106 from a left, rear vantage point. In some implementations, the left rear imager 116a may be positioned at a height that is relatively at or above a top row 120 of the plurality of logs 106. In some implementations, the left rear imager 116a may be positioned at a height that is relatively at or below a bottom row 122 of the plurality of logs 106. In some implementations, the left rear imager 116a may be positioned at a height that is relatively between the top row 120 and the bottom row 122 of the plurality of logs. In some implementations, the left rear imager 116a may have a selectively adjustable height. For example, the left rear imager 116a may be coupled to a post 124 that has a selectively adjustable height. In such an implementation, the height of the left rear imager 116a may be selectively adjusted. As such, the left rear imager 116a may capture a plurality of depictions of the first end 110 of the plurality of logs 106, with each depiction being captured at a different height.

The right rear imager 116b may capture a depiction of the first end 110 of the plurality of logs 106 from a right, rear vantage point. In some implementations, the right rear imager 116b may be positioned at a height that is relatively at or above the top row 120 of the plurality of logs 106. In some implementations, the right rear imager 116b may be positioned at a height that is relatively at or below the bottom row 122 of the plurality of logs 106. In some implementations, the right rear imager 116b may be positioned at a height that is relatively between the top row 120 and the bottom row 122 of the plurality of logs. In some implementations, the right rear imager 116b may have a selectively adjustable height. For example, the right rear imager 116b may be coupled to a post 126 that has a selectively adjustable height. In such an implementation, the height of the right rear imager 116b may be selectively adjusted. As such, the right rear imager 116b may capture a plurality of images of the first end 110 of the plurality of logs, with each image being captured at a different height.

The images of the first end 110 of the plurality of logs 106 captured by one or both of the rear imagers 116 may be used to determine a value for a diameter 128 for the first end(s) 110 of one or more of the plurality of logs 106. In some implementations, the value for the diameter 128 for the first end 110 of a log 106 may be based upon a measured or determined distance between opposing sides of the first end 110 of the log 106. As discussed below, the value for the diameter 128 may be based upon the depictions of the first ends 110 of the plurality of logs 106 captured by one or more of the rear imagers 116. In some implementations, for example, the value for the diameter 128 for the first end of a log 106 may be based a number of pixels separating opposing sides of the log within one of the images captured by one of the rear imagers 116, in which each pixel is determined to extend across a defined length.

In some implementations, the defined length for a pixel may be modified based upon a distance between the rear imager 116 and the first end 110 of the log 106. Such a distance may be based, for example, on a focal length of the imager 116. In some implementations, one or more range finders 134 may be used to determine a range or distance between one or more of the rear imagers 116 and the first end 110 of one or more of the logs 106. In some implementations, for example, the range finder 134 may use a time-of-flight measurement to detect the distance between the range finder 134 and an object, such as the first end 110 of the logs 106. Thus, for example, the defined length of a pixel may increase as the distance between the imager 116 and the first end 110 of the log 106 increases. In some implementations, the value for the diameter 128 for the first end 110 of a log 106 may be based upon depictions of the first end 110 of the log 106 captured in a plurality of images taken by one or both of the rear imagers 116. Such a value for the diameter 128 of the first end 110 of the log 106 may be used to determine a product value (e.g., board-feet value) for the log 106.

The transport trailer 104 may be positioned along the log scaling system 100 such that the one or more forward imagers 118 may be positioned to capture images of the second end 112 of one or more logs 106 in the plurality of logs. For example, the left forward imager 118a may capture a depiction of the second end 112 of the plurality of logs 106 from a left, forward vantage point. In some implementations, the left forward imager 118a may be positioned at a height that is relatively at or above the top row 120 of the plurality of logs 106. In some implementations, the left forward imager 118a may be positioned at a height that is relatively at or below the bottom row 122 of the plurality of logs 106. In some implementations, the left forward imager 118a may be positioned at a height that is relatively between the top row 120 and the bottom row 122 of the plurality of logs. In some implementations, the left forward imager 118a may have a selectively adjustable height. For example, the left forward imager 118a may be coupled to an arm 130 that may be selectively rotatable about one or more axes of rotation. In such an implementation, the height and/or lateral position of the left forward imager 118a may be selectively adjusted. As such, the left forward imager 118a may capture a plurality of depictions of the second end 112 of the plurality of logs 106, with each depiction being captured at a different height.

The right forward imager 118b may capture a depiction of the second end 112 of the plurality of logs 106 from a right, forward vantage point. In some implementations, the right forward imager 118b may be positioned at a height that is relatively at or above the top row 120 of the plurality of logs 106. In some implementations, the right forward imager 118b may be positioned at a height that is relatively at or below the bottom row 122 of the plurality of logs 106. In some implementations, the right forward imager 118b may be positioned at a height that is relatively between the top row 120 and the bottom row 122 of the plurality of logs 106. In some implementations, the right forward imager 118b may have a selectively adjustable height. For example, the right rear imager 116b may be coupled to an arm 132 that may be selectively rotatable about one or more axis of rotation. In such an implementation, the height and/or lateral position of the right forward imager 118b may be selectively adjusted. As such, the right forward imager 118b may capture a plurality of images of the second end 112 of the plurality of logs 106, with each image being captured at a different height.

The images of the second end 112 of the plurality of logs 106 captured by one or both of the forward imagers 118 may be used to determine a value for a diameter (not shown) for the second end(s) 112 of one or more of the plurality of logs 106. In some implementations, the value for the diameter for the second end 112 of a log 106 may be based upon a measured or determined distance between opposing sides of the second end of the log 106. As discussed below, the value for the diameter of the second end 112 of the log 106 may be based upon the depictions of the second ends 112 of the plurality of logs 106 captured by one or more of the rear imagers 116. In some implementations, for example, the value for the diameter of the second end 112 of a log 106 may be based a number of pixels separating opposing sides of the second end 112 of the log 106 within one of the images captured by one of the rear imagers 116, in which each pixel is determined to extend across a defined length.

In some implementations, the defined length for a pixel may be modified based upon a distance between the rear imager 116 and the first end 110 of the log 106. Such a distance may be based, for example, on a focal length of the imager 116. In some implementations, one or more range finders may be used to determine a range or distance between one or more of the forward imagers 118 and the first end 110 of one or more of the logs 106, as discussed above. Thus, for example, the defined length of a pixel may increase as the distance between the imager 116 and the second end 112 of the log 106 increases. In some implementations, the value of the diameter for the second end 112 of the log 106 may be based upon depictions of the second end 112 of the log 106 captured in a plurality of images taken by one or both of the forward imagers 118. Such a diameter value may be used to determine a product value (e.g., board-feet value) for the log 106.

In some implementations, one or both of the rear imagers 116 and/or the forward imagers 118 may be used to determine a value for the length 114 of one or more of the logs 106 in the plurality of logs. For example, in some implementations one or more of the rear imagers 116 and/or the forward imagers 118 may capture a depiction within one or more images that shows a top portion 136 of one or more logs 106 in which the top portion 136 extends from the first end 110 of the log 106 to the second end 112 of the log 106. In such an implementation, the depiction of the top portion 136 of the log 106 may be used to determine a value for the length 114 of the log 106 by, for example, counting the pixels between the first end 110 and the second end 112 of the depiction of the log 106.

In some implementations, images and measurements from one or more of the rear imagers 116, the forward imagers 118, and/or the range finders 134 may be used to determine the length 114 of the log 106 using relative coordinate locations of the first end 110 and/or the second end 112 of one or more of the logs 106. In such an implementation, for example, the distances between and relative positions of each of the rear imagers 116 and the forward imagers 118 may be known. As such, an offset between the rear imager 116 and the first end 110 of each log 106 may be determined. Such an offset may be used to determine the position and/or coordinates of the respective first ends 110 of each log 106 relative to the rear imager 116. Such an offset may be based upon the distance between the rear imager 116 and the first end 110 of the log 106 (using, for example, the focal length of the rear imager 116), as well as an angle at which the rear imager 116 is positioned relative to a line that extends between the two rear imagers 116. Using the angle and distance information, a relative location of the first end(s) 110 of one or more logs 106 may be determined. In addition, an offset between the forward imager 118 and the second end 112 of each log 106 may likewise be determined using, for example, focal length and angle information involving the forward imager 118. Such an offset for the second end 112 of the log 106 may be used to determine a position of the second end 112 relative to the forward imager 118. Thus, the length 114 of each log 106 may be determined based upon the relative position information for the first end 110 and the second end 112 of each log.

In some implementations, the log scaling system 100 may include a wireless transceiver 138. Such a wireless transceiver 138 may be used, for example, to receive signals transmitted from one or more wireless tags, such as wireless tags 140 that may be physically coupled, for example, to one or more logs 106, to the truck 102, and/or to the trailer 104. Such wireless tags 140 may be used to identify one or more of the logs 106 individually. Such wireless tags 140 may be used to identify a plurality or set of logs 106 as a group. Such wireless tags 140 may be used to identify the truck 102 and/or driver.

In some implementations, the log scaling system 100 may include a processor-enabled controller 142 that may be communicatively coupled to one or more of the rear imagers 116, the forward imagers 118, the range finder(s) 134, and/or the wireless transceiver 138. The processor-enabled controller 142 may be used to determine one or more of the diameter values, length value, and/or product value (e.g., board-feet), as discussed below, for one or more of the logs 106 included within the plurality of logs being transported by the trailer 104. In some implementations, the processor-enabled controller 142 may be located proximate the pad 101. In some implementations, the processor-enabled controller 142 may be removed from the pad 101, and may be communicatively coupled to the various other components of the log scaling system 100 via one or more communications networks. Such communications networks may be, for example, one or more LANs and/or WANs, and may include well-known wired or wireless enterprise-wide computer networks, intranets, extranets, and the Internet. In some implementations, the processor-enabled controller 142 may be communicatively coupled to a plurality of log scaling systems 100.

Figure 2A:
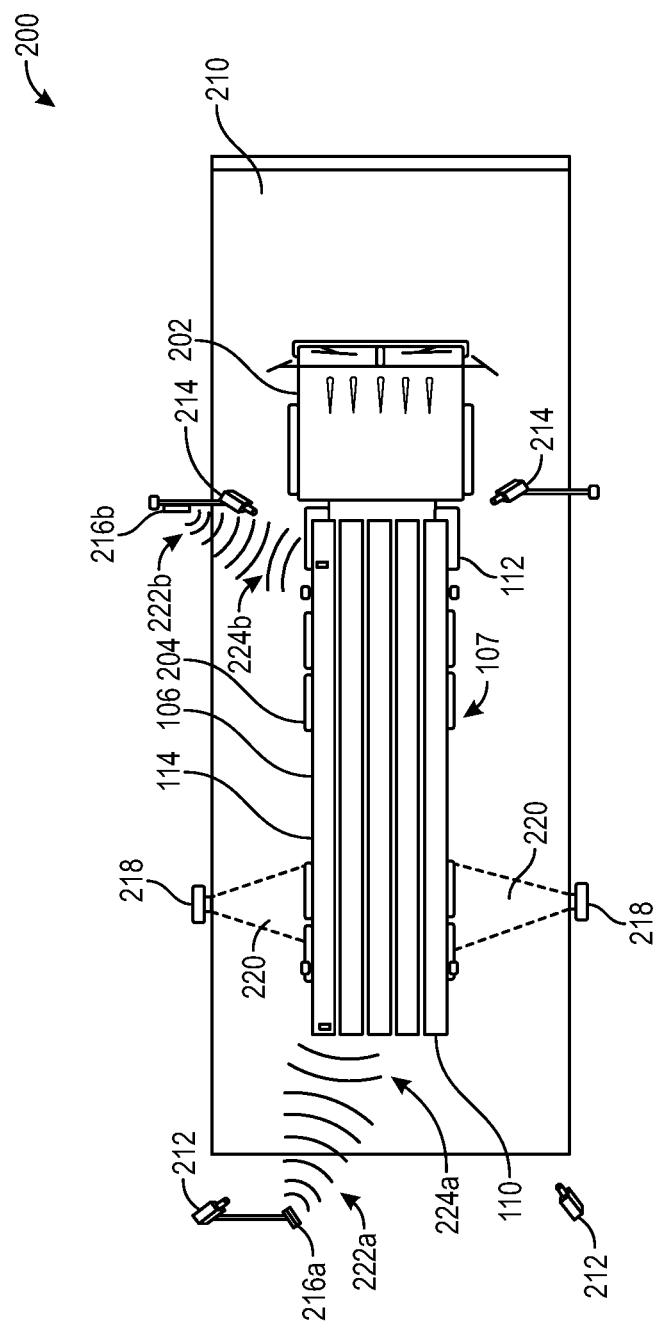
FIG. 2A is a top plan view of a log scaling system on which is positioned a truck and associated transport trailer, according to at least one illustrated implementation.
Figure 2B:
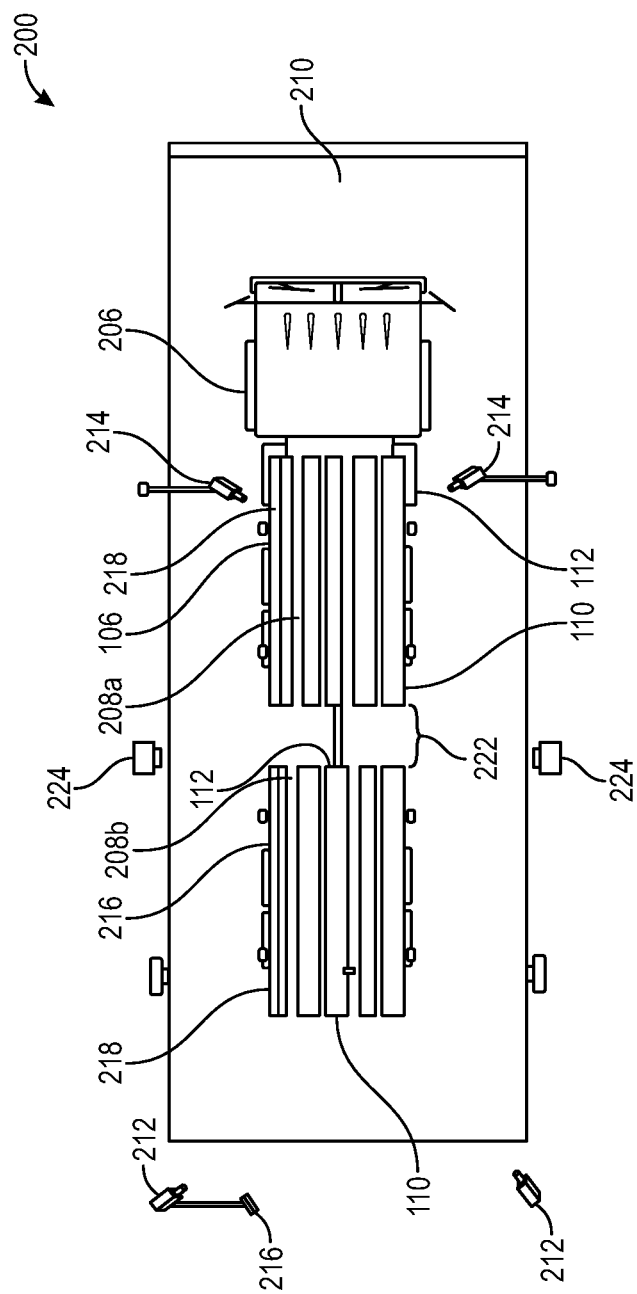
FIG. 2B is a top plan view of the log scaling system on which is positioned another truck, an associated first transport trailer, and an associated second transport trailer, according to at least one illustrated implementation.

FIGS. 2A and 2B show a log scaling system 200 that may be used to scale logs on one or more types of truck and trailer configurations. As shown in FIG. 2A, for example, a first truck 202 and associated transport trailer 204 are positioned on the log scaling system 200, whereas FIG. 2B shows a second truck 206 and two associated trailers 208a, 208b that are positioned on the log scaling system 200 in which a gap 222 is present between the two trailers 208a and 208b. The trailers 204 and 208a, 208b may be used to transport a plurality of logs. The log scaling system 200 may include a pad 210, one or more rear imagers 212, and one or more forward imagers 214. In some implementations, the pad 210, the rear imagers 212, and the forward imagers 214 may be similar to the pad 101, the rear imagers 116, and the forward imagers 118 discussed above.

In some implementations, the log scaling system 200 may include one or more range finders 216a, 216b that may be used to determine a distance between the range finders 216a, 216b and the first end 110 and/or the second end 112, respectively, of one or more logs 106 in the plurality of logs being transported on the trailers 208a and/or 208b, as discussed above with range finder. In such implementations, the range finders 216a, 216b may emit one or more signals 222a, 222b towards the first end 110 and/or the second end 112, respectively, of each log 106. The range finders 216a, 216b may receive a reflected signal 224a, 224b that has been reflected from the first end 110 and/or the second end 112, respectively, of one of the logs 106 in the plurality of logs. The distance of the first end 110 and/or the second end 112 of the log 106 from the range finders 216a, 216b may be determined, for example, by using a time-of-flight determination. In some implementations, the distance and direction between the range finders 216a, 216b and the first end 110 and/or the second end 112 of the log 106 may be used to determine a position of the first end 110 and/or the second end 112 of the log 106 relative to the range finders 216a, 216b. Such a relative position may be used to determine a value for the length 114 of one or more of the logs 106. For example, in some implementations, the relative position data may be used to determine a first coordinate value to be associated with the first end 110 of the log 106 and a second coordinate value to be associated with the second end 112 of the log 106. The value associated with the length 114 of the log 106 may be determined based upon the first coordinate value and the second coordinate value.

The log scaling system 200 may include one or more presence detectors 218 that may be used to detect a presence of an object on the pad 210. In some implementations, the presence detector 218 may transmit a light or other signal and determine a presence of an object based upon reflection of the light or other signal that the presence detector 218 receives. In such an implementation, the presence detector 218 may have a field-of-view 220 in which the presence detector 218 transmits the light or other signal in a direction towards the pad 210. The presence detector 218 may then detect a reflected signal when an object is located on the pad 210 in the path of the light or other signal. In some implementations, the set of presence detectors 218 may function together to determine the presence of an object. For example, in some implementations, one of the presence detectors 218 may transmit a signal laterally across the pad 210 in the direction of the second presence detector 218, which may be located on the opposite side of the pad 210. The second presence detector 218 may determine the presence based upon whether it receives the signal transmitted by the first presence detectors 218.

In some implementations, the presence detectors 218 may be used to determine the number of trailers that are physically coupled to a truck. In such an implementation, for example, the presence detectors 218 may be placed at a height corresponding to a height above ground at which a trailer may be carrying a load 107 of logs 106. The load 107 of logs 106 being carried by a trailer may thereby be detected as the truck 202, 206 transports the trailer across the pad 210. In implementations in which the first truck 202 carries a single trailer 204, then the presence detectors 218 may indicate a continuous or near continuous presence of an object within the field-of-view 220 of the presence detector 218 as the first truck 202 transports the single trailer 204 across the pad 210. In situations in which the a truck transports multiple trailers (e.g., as with second truck 206), the presence detectors 218 may detect the gap 222 between the first trailer 208a and the second trailer 208b as the second truck 206 transports the two associated trailers 208a, 208b across the pad 210. In such situations in which the truck 206 pulls multiple trailers, the log scaling system 200 may modify the types of measurements being taken. For example, in a multiple trailer situation, the log scaling system 200 may not provide a value related to length of any of the logs 106. As such, the log scaling system 200 may only provide a value related to a diameter for one end of each log in the first trailer 208a and for one end of each log in the second trailer 208b.

In some implementations, the log scaling system 200 may have multiple sets of imagers that may be selectively activated and/or deactivated depending upon the number of trailers being pulled by a truck. For example, in the situation involving the second truck 206, the log scaling system 200 may selectively activate a third set of imagers 224 located proximate the gap 222 between the first trailer 208a and the second trailer 208b. As such, the third set of imagers 224 may be used to capture images of either or both ends of the logs 106 in the first trailer 208a and/or the second trailer 208b that are located proximate the gap 222. In such an implementation, the log scaling system 200 may be used to determine a length for each log 106 in the first trailer 208a and/or the second trailer 208b.

Figure 3A:
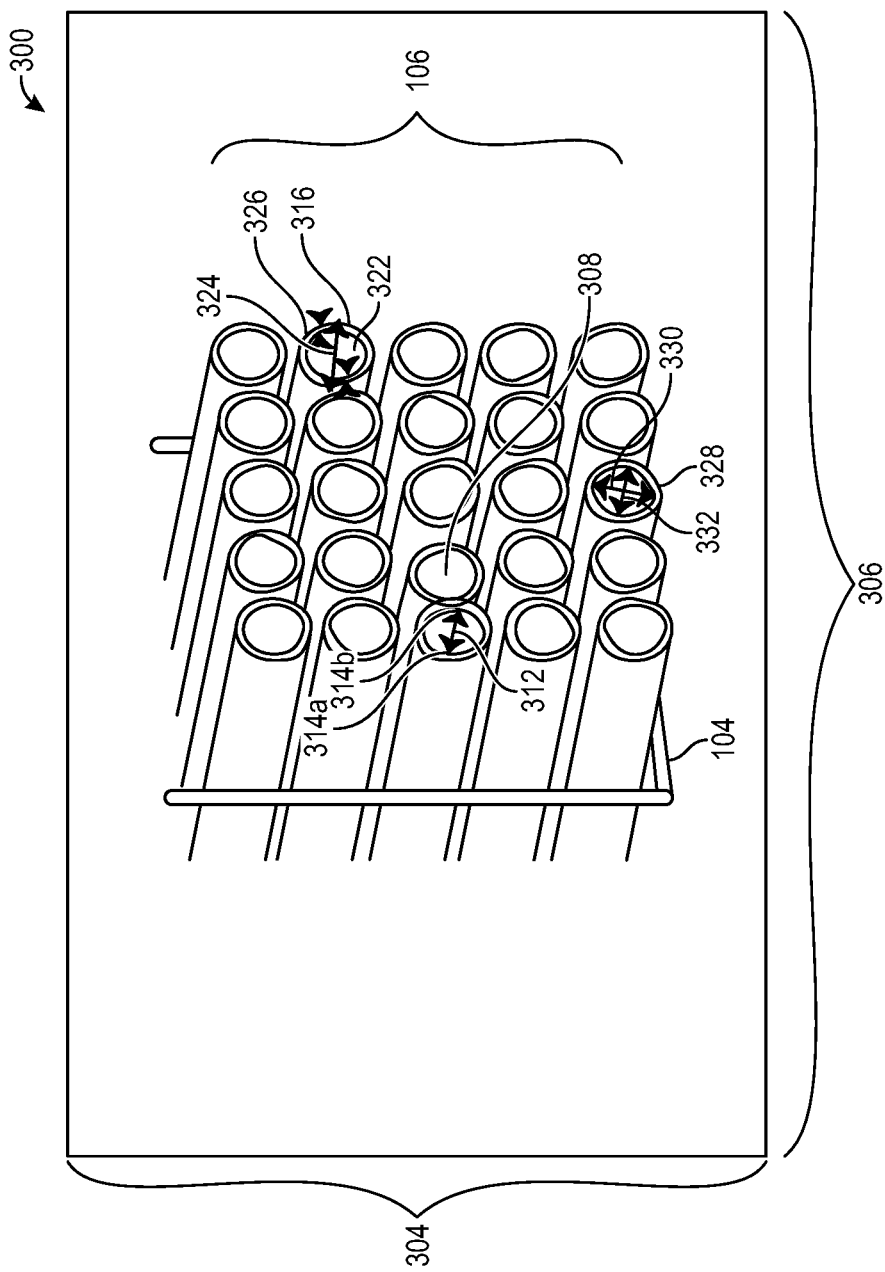
FIG. 3A is a depiction of an image captured by an imager, in which the image provides a left side isometric view of a first end of a plurality of logs, according to at least one illustrated implementation.
Figure 3B:
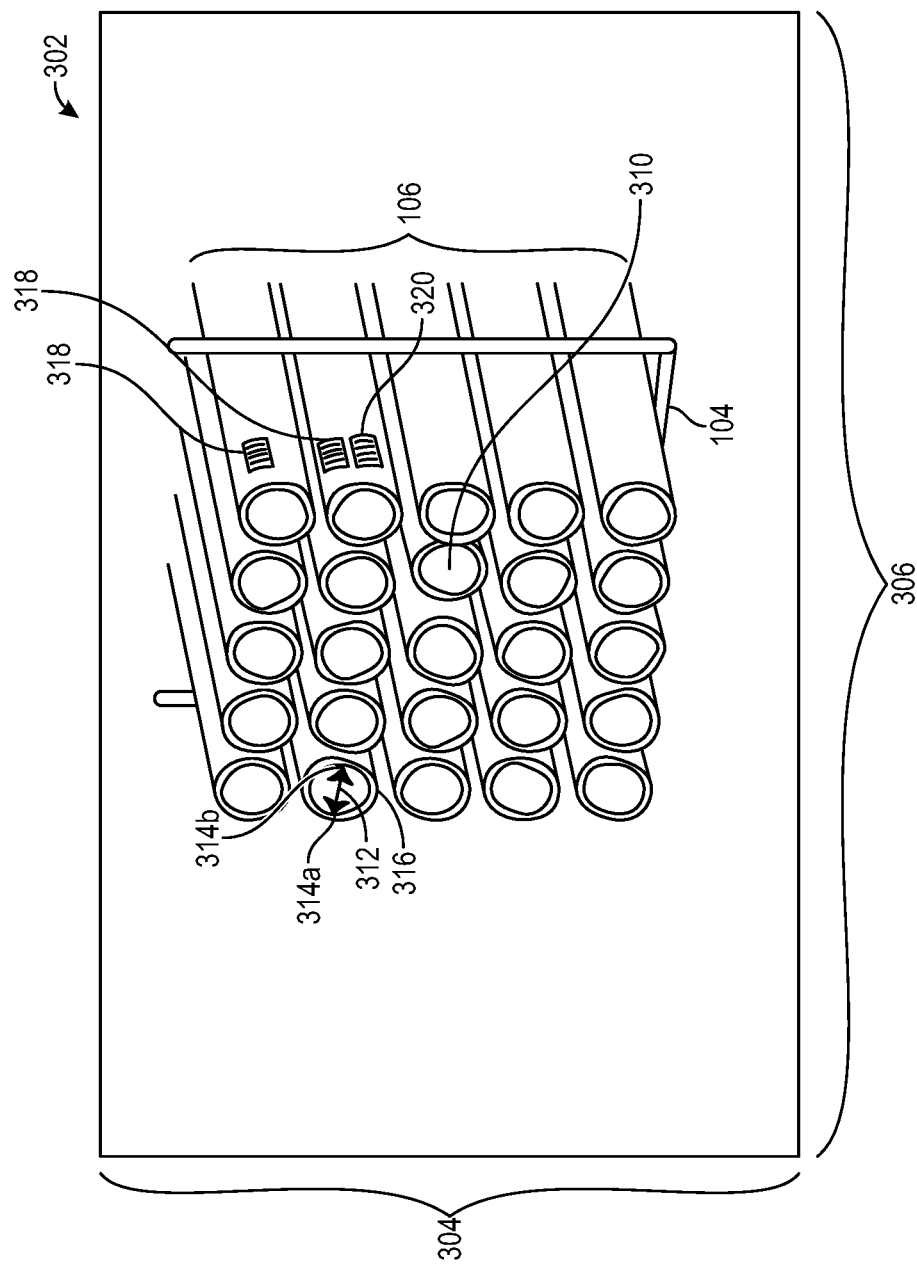
FIG. 3B is a depiction of an image captured by an imager, in which the image provides a right side isometric view of the first end of the plurality of logs shown in FIG. 3A, according to at least one illustrated implementation.

FIGS. 3A and 3B show a first image 300 and a second image 302 captured by respective imagers, in which the first image 300 is taken from the left, rear portion of a plurality of logs 106 and in which the second image 302 is taken from the right, rear portion of the plurality of logs 106, according to at least one illustrated implementation. One or more of the logs 106 in the plurality of logs 106 may have an outer layer of bark (e.g., a bark component 316), and an interior component for lumber (e.g., a lumber component 322). Each of the first image 300 and the second image 302 may have a height 304 and a width 306. The first image 300 and the second image 302 be comprised of a plurality of pixels. The plurality of pixels may be arranged in a plurality of rows that extend along the respective heights 304 of the first image 300 and the second image 302, and a plurality of columns that extend along the respective widths 306 of the first image 300 and the second image 302.

Referring to FIGS. 3A and 3B, each of the first image 300 and the second image 302 may contain a depiction of a first end 110 of at least one of the logs 106 in the plurality of logs. In some implementations, the depictions of at least some of the first ends 110 may be obstructed, such as shown, for example, with first obstructed log 308 in FIG. 3A and second obstructed log 310 in FIG. 3B. Preferably, the depictions of the first end 110 captured by the first image 300 and the second image 300 includes at least one non-obstructed depiction of the first end 110 of each log 106 in the plurality of logs. In some implementations, the depictions of the first end 110 captured by the first image 300 and the second image 300 includes at least one non-obstructed depiction of the first end 110 of substantially every log 106 in the plurality of logs (e.g., ninety percent, ninety-five percent, or more of the logs 106 in the plurality of logs).

Figure 3D:
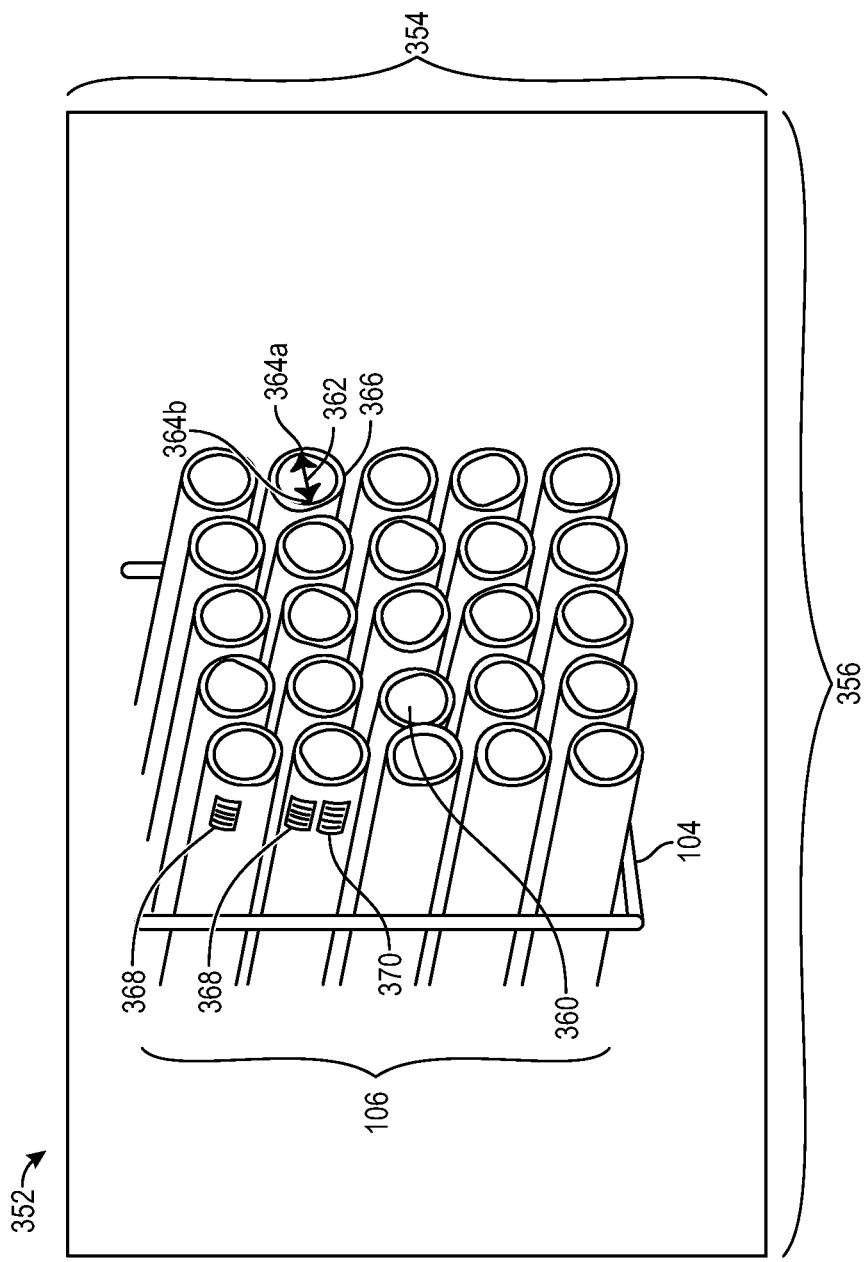
FIG. 3D is a depiction of an image captured by an imager, in which the image provides a right side isometric view of the second end of the plurality of logs shown in FIG. 3C, according to at least one illustrated implementation.

Referring to FIGS. 3C and 3D, each of the first image 350 and the second image 352 may contain a depiction of a second end 112 of at least one of the logs 106 in the plurality of logs. In some implementations, the depictions of at least some of the second ends 112 may be obstructed, such as shown, for example, with first obstructed log 358 in FIG. 3C and second obstructed log 360 in FIG. 3C. Preferably, the depictions of the second end 112 captured by the first image 350 and the second image 352 includes at least one non-obstructed depiction of the second end 112 of each log 106 in the plurality of logs. In some implementations, the depictions of the second end 112 captured by the first image 350 and the second image 352 includes at least one non-obstructed depiction of the second end 112 of substantially every log 106 in the plurality of logs (e.g., ninety percent, ninety-five percent, or more of the logs 106 in the plurality of logs).

The first image 300 and the second image 302 may be used to determine a diameter value 312 for the first end 110 of one or more logs 106 in the plurality of logs. The diameter value 312 may correspond to the diameter of the first end 110 of the log 106 being depicted. In some implementations, the diameter value 312 of a log 106 may be determined based on the number of pixels between opposing sides 314a, 314b of the log 106. In some implementations, the diameter value 312 of a log 106 may be based upon a maximum distance between opposing sides 314a, 314b of the log 106. As such, the maximum distance may be determined based upon the number of pixels between the opposing sides 314a, 314b of the log 106. In such implementations, each pixel in each of the first image 300 and/or the second image 302 may correspond to a determined distance. Accordingly, the diameter value 312 may be determined based upon the number of pixels between the opposing sides 314a, 314b of the log 106.

In some implementations, the diameter value 312 may exclude any bark component 316 located along the opposing sides 314a, 314b of the log 106. In such implementations, for example, the interior portion of the first end 110 of the log 106 between the bark component 316 may be identified and used to determine the diameter value 312 associated with the lumber component 322 of the log 106. In some implementations, a width value 324 may be determined between opposing outside edges of each first end 110 of a log 106. A bark width value 326 may be determined in such implementations for each of the opposing sides of the first end 110 of the log 106 at which the width value 324 is determined. The bark width value 326 may be associated with a length of the bark component 316 along a line that is used to measure the width value 324. Each of the bark width values 326 may be deducted from the width value 324 to determine the diameter value 312 for the first end 110 of the log 106 in which the diameter value 312 is associated with the lumber component 322 of the log 106.

In some implementations, the determined distance associated with each pixel in the first image 300 and/or the second image 302 may be based upon one or more characteristics of the respective first image 300 and the second image 302. For example, as shown in FIG. 3A, the determined distance for each pixel in the first image 300 may be based upon a distance between the imager used to capture the first image 300 and the first ends 110 of the logs 106 depicted in the first image 300. For example, the determined distance for each pixel may be relatively larger the greater the distance between the imager used to capture the first image 300 and the first ends 110 of the logs 106 depicted in the first image 300. The distance between the imager used to capture the first image 300 and the first ends 110 of the logs 106 depicted in the first image 300 may be based, for example, upon a focal length of the imager used to capture the first image 300. In some implementations, the distance between the imager used to capture the first image 300 and the first ends 110 of the logs 106 depicted in the first image 300 may be based upon a measurement taken by another device, such as the ranger finder 134. In some implementations, the determined distance associated with each pixel may be based upon other considerations. For example, in some implementations, the determined distance may be based upon an angle at which the first end 110 of each log 106 is depicted. For example, in such implementations, the greater angle at which the first end 110 is depicted in the first image 300, the relatively greater the determined distance for each pixel.

In some implementations, a plurality of width values may be determined for the distance between opposing sides of a log 106. For example, for a non-symmetrical log 328 (FIG. 3A), a first width value 332 may be determined between opposing sides of the non-symmetrical log 328 along a substantially vertical axis, and a second width value 334 may be determined between opposing sides of the non-symmetrical log 328 along a substantially horizontal axis. Additional width values may also be taken between opposing sides of the non-symmetrical log 328. The diameter value for the non-symmetrical log 328 may be equal to either or a combination of the first width value 332 and/or the second width value 334 and/or any other width values that are determined. For example, in some implementations, the diameter value for the non-symmetrical log 328 may be equal to the greater of the first width value 332, the second width value 334, and any other width values determined for the non-symmetrical log 328. In some implementations, the diameter value for the non-symmetrical log 328 may be equal to the average of the first width value 332, the second width value 334, and any other width values determined for the non-symmetrical log 328.

Although the discussion above of FIGS. 3A and 3B describe the first end 110 of the logs 106, the same techniques may be applied to depictions of the second end 112 of the logs 106 to obtain a diameter value for the second ends 112 of one or more of the logs 106 in the plurality of logs.

One or more of the logs 106 may include one or more machine-readable symbols, such as a log-based machine-readable symbol 318 and/or a load-based machine-readable symbol 320. Such a machine-readable symbol may be visual, such as a barcode symbol and/or a QR code symbol, and/or such a machine-readable symbol may be transmitted as part of a wireless signal, such as may occur, for example, using a RFID transmitter. The log-based machine-readable symbol 318 may be used to encode information that uniquely identifies each log 106 in the plurality of logs. In some implementation, the log-based machine-readable symbol 318 may be used to uniquely identify each log 106 within the plurality of logs. In some implementations, the log-based machine-readable symbol 318 may also encode information related to the log 106, such tree-type information that identifies the type of tree for the log 106. The load-based machine-readable symbol 320 may be used to identify a set or plurality of logs 106, such as, for example, the plurality of logs 106 being transported the trailer 104.

In another aspect of some implementations, the information captured in the first image 300 and/or the second image 302 may be used to determine tree-type information that identifies the type of tree or species of tree for the log 106. In one or more such implementations, the first image 300 and/or the second image 302 determine the type of tree or species of tree for the log 106 by accessing a database of various images of types or species of trees and comparing the first image 300 and/or the second image 302 against the images of types or species of trees in the database and then using machine learning to match the first image 300 and/or the second image 302 to a known type or species of tree in the database. In other implementations, other techniques are used to identify the type of tree or species of tree for the log 106 from the first image 300 and/or the second image 302. In some implementations, the identification of the type or species of tree for the log 106 is used in the determination of the product value (e.g., board-feet value) or other value of the log.

Figure 4:
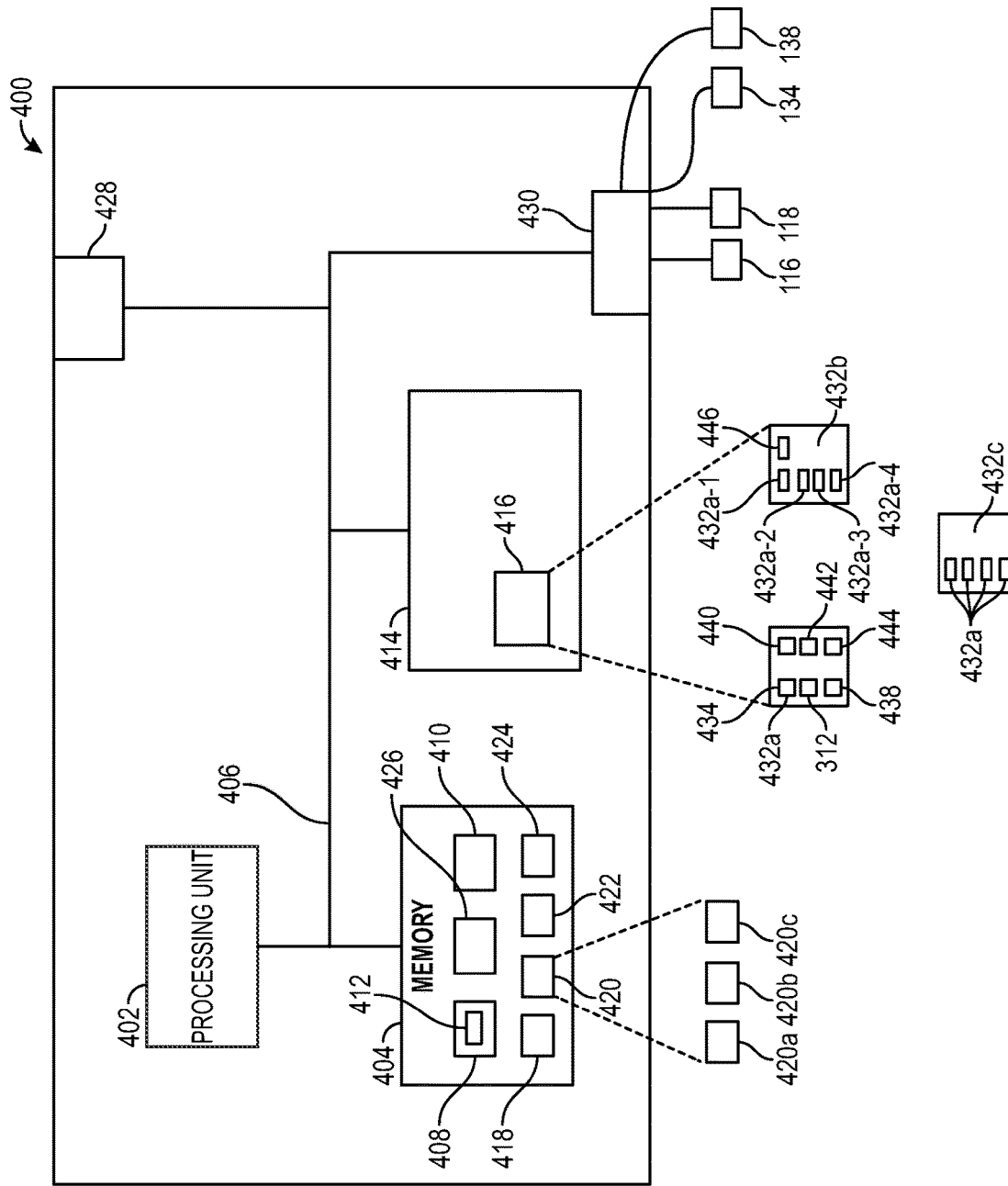
FIG. 4 is an isometric exterior view of a block diagram of a computer that may be used by a customer, a provider, and/or a third party for scaling a plurality of logs, according to at least one illustrated implementation.

FIG. 4 shows a block diagram of a control system 400 that may be used by a customer, a provider, and/or a third party for scaling a plurality of logs 106, according to at least one illustrated implementation. Such a control system 400 may be used, for example, as the processor-enabled controller 142 that may be communicatively coupled to one or more log scaling systems 100.

The control system 400 may take the form of any current or future developed computing system capable of executing one or more instruction sets. The control system 400 includes a processor 402, a system memory 404 and a system bus 406 that communicably couples various system components including the system memory 404 to the processor 402. The control system 400 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80x86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

When so arranged as described herein, each processor 402 or processor-based computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

In more detail, within the log scaling systems and methods discussed in the present disclosure, log scaling calculations are generated in a computing device in real time, and one or more values resulting from such calculations may be communicated via a wired or wireless network such as the Internet. These innovative techniques described in the present disclosure are new and useful, and the innovation is not well-known, routine, or conventional in the logging and log scaling industry.

The innovation described herein may use some known building blocks combined in new and useful ways along with other structures and limitations to create something more than has heretofore been conventionally known. The embodiments improve on computing systems which, when un-programmed or differently programmed, cannot perform or provide the specific log scaling features claimed herein. The embodiments described in the present disclosure improve upon known log scaling processes and techniques. Furthermore, the combination of acts as described in conjunction with the present embodiments provides new information, motivation, and business results that are not already present when the acts are considered separately.

There is no prevailing, accepted definition for what constitutes an abstract idea. To the extent the concepts discussed in the present disclosure may be considered abstract, the claims present tangible, practical, and concrete applications of said allegedly abstract concepts.

The embodiments described herein use computerized technology to improve the technology of log scaling, but there other techniques and tools remain available to scale logs. Therefore, the claimed subject matter does not foreclose the whole or even substantial log scaling technological area.

The processor 402 may be any logic processing unit, such as one or more central processing units (CPUs), microprocessors, digital signal processors (DSPs), application-specific integrated circuits (ASICs), field programmable gate arrays (FPGAs), programmable logic controllers (PLCs), etc. In some implementations, some or all of the processor 402, the memory 404, and one or more other components discussed below may be included within a single integrated circuit, such as may occur, for example, with a system on chip (SoC).

The system bus 406 can employ any known bus structures or architectures, including a memory bus with memory controller, a peripheral bus, and a local bus. The system memory 404 includes read-only memory ("ROM") 408 and random access memory ("RAM") 410. A basic input/output system ("BIOS") 412, which can form part of the ROM 408, contains basic routines that help transfer information between elements within the control system 400, such as during start-up. Some implementations may employ separate buses for data, instructions and power.

The control system 400 also includes one or more internal nontransitory storage systems 414. Such internal nontransitory storage systems 414 may include, but are not limited to, any current or future developed persistent storage device 416. Such persistent storage devices 416 may include, without limitation, magnetic storage devices such as hard disc drives, electromagnetic storage devices such as memresistors, molecular storage devices, quantum storage devices, electrostatic storage devices such as solid state drives, and the like.

The one or more internal nontransitory storage systems 414 communicate with the processor 402 via the system bus 406. The one or more internal nontransitory storage systems 414 may include interfaces or device controllers (not shown) communicably coupled between nontransitory storage system and the system bus 406, as is known by those skilled in the relevant art. The nontransitory storage systems 414 and associated storage devices 416 provide nonvolatile storage of computer-readable instructions, data structures, program modules and other data for the control system 400. Those skilled in the relevant art will appreciate that other types of storage devices may be employed to store digital data accessible by a computer, such as magnetic cassettes, flash memory cards, RAMs, ROMs, smart cards, etc.

Program modules can be stored in the system memory 404, such as an operating system 418, one or more application programs 420, other programs or modules 422, drivers 424 and program data 426. The application programs 420 may be stored as one or more executable instructions.

The application programs 420 may include, for example, one or more machine executable instruction sets (i.e., diameter value instruction set 420a) capable of determining a diameter value for one or more of the first end 110 and/or second end 112 of a log 106. In some implementations, the diameter value instruction set 420a may identify opposing sides within a depiction of the first end 110/second end 112 of the log, such as a depiction captured by one or more imagers (e.g., rear imagers 116). The diameter value instruction set 420a may determine the number of pixels that are between the identified opposing sides, and may determine and/or associate a distance with each pixel. As such, the diameter value instruction set 420a may determine a diameter value by multiplying the number of pixels between the opposing sides of the end of a log 106 by the distance associated with an individual pixel. In some implementations, the diameter value instruction set 420a may determine the distance associated with each pixel, based, for example, upon the distance between the imager that captured the depiction and the end of the log being depicted. Such a determination of distance may be based, for example, upon the focal length of the imager.

The application programs 420 may include, for example, one or more machine executable instruction sets (i.e., length value instruction set 420b) capable of determining a length value for one or more of the logs 106 in the plurality of logs. Such a length value may be determined, for example, based upon a depiction that shows the length 114 of a log 106 between the first end 110 and the second end 112. Such a length may be based, for example, upon the number of pixels between the first end 110 and the second end 112. In some implementations, the length value instruction set 420b may determine the relative positions of the first end 110 and the second end 112 of the log 106, and use the relative positions to determine the length value. In such an implementation, the distance between the rear imagers 116 and the forward imagers 118 may be determined. In addition, the distance and position of the first end 110 of the log 106 may be determined relative to the rear imagers 116 in which the relative position of the first end 110 of the log 106 is stored as a first location value. The distance and position of the second end 112 of the log 106 may be determined relative to the forward imagers 118 in which the relative position of the second end 112 of the log 106 is stored as a second location value. In some implementations, the relative positions and/or location values of the first end 110 and the second end 112 of the log 106 may be used to determine the length value for the log 106.

The application programs 420 may include, for example, one or more machine executable instruction sets (product value (e.g., board-feet value) instruction set 420c) capable of determining a board-feet value for one or more of the logs 106 in the plurality of logs. In such an implementation, the board-feet value instruction set 420c may use one of the diameter value for at least one of the first end 110 and/or the second end 112 of the log 106 as determined by diameter value instruction set 420a, as well as the length value determined for the log 106 by the length value instruction set 420b, to determine the board-feet value for the log 106. Such a board-feet value may be determined, for example, by multiplying the lesser of the diameter values determined for the log 106 by the length value determined for the log 106 to determine a product value. The resulting product value may then be compared to values in a board-feet table to determine the board-feet value. Various types of board-feet tables may be used to determine the board-feet value, including, for example, the Scribner Decimal C Log Rule Table, the Doyle Log Scale, and the International Log Scale.

The application programs 420 may include, for example, one or more machine executable instruction sets (log scaling instruction set 420d) capable of creating, modifying, and storing data records that contain information and/or data related to one or more of the logs 106. Such data records may include, for example, a log record 432a, a load record 432b, and a distribution record 432c, each of which may be stored in the nontransitory storage systems 414 and/or in program data 426. The log record 432a may include data and information related to a single log 106. Such information for each log 106 may include, for example, the log identifier 434, a diameter value 312 determined by diameter value instruction set 420a, a length value 438 determined by length value instruction set 420b, a product value 440 (e.g., board-feet value) determined by instruction set 420c, one or more images that depict some or all of the log 106 (e.g., the first end 110 and/or the second end 112 of the log 106), and a tree type identifier 444 as encoded, for example, by the tree type machine-readable symbol 318 and that identifies the type of tree for the log 106.

Each load record 432b may include information related to one or more log records 432a, such as first log record 432a-1, second log record 432a-2, third log record 432a-3, and fourth log record 432a-4, that collectively form a load record 432b. Each of the log records 432a may identify logs 106 that are being transported by the same trailer 104. In some implementations, the load record 432b may store pointers to one or more individual log records 432a that indicate a set of logs 106 being transported by the trailer 104 and that together form a load 107. In some implementations, the load record 432b may include a load identifier 446 that may be used to uniquely identify the load 107 of logs 106 being transported by the trailer 104.

Each distribution record 432c may identify a plurality of logs 106 from a plurality of loads 107 of logs. Such a distribution record 432c may be used, for example, to fulfill an order for a specified product value (e.g., board-feet) of lumber that is to be distributed or shipped to a customer. The distribution record 432c may be comprised, for example, by a set of one or more log records 432a that specify a plurality of logs 106. In some implementations, the distribution record 432c may be comprised of a set of information that identifies specific logs 106, such as pointers to log records 434a and/or a list of log identifiers 434.

In some implementations, one or more distribution records 432c may be formed based upon an order received from a customer. For example, a customer may request a certain amount of product value (e.g., board-feet) of lumber to be delivered within a set period of time. The processor-enabled device may aggregate logs 106 into a distribution load to meet the amount of board-feet requested by the customer. In some implementations, the processor-enabled device may take logs 106 from different loads 107 (e.g., loads 107 from different trailers 104) and form a distribution load of logs 106 to fulfill an order. In some implementations, the processor-enable device may be filling multiple requests or orders for board-feet of lumber, potentially from different customers. In such an implementation, the processor-enabled device may form multiple distribution records 432c identifying multiple sets of logs 106, with each distribution record 432 being associated with each order. In such an implementation, the processor-enabled device may use different criteria for forming the multiple distribution loads of logs 106. Such criteria may include, for example, forming a distribution load that most closely matches the board-feet of lumber requested by a particular client or clients. Such criteria may include, for example, forming the multiple distribution loads of logs 106 that provide a best fit for the board-feet of logs 106 requested in a plurality of orders.

In some embodiments, the control system 400 operates in an environment using one or more of the network interfaces 428 to optionally communicably couple to one or more remote computers, servers, display devices, via one or more communications channels. These logical connections may facilitate any known method of permitting computers to communicate, such as through one or more LANs and/or WANs. Such networking environments are well known in wired and wireless enterprise-wide computer networks, intranets, extranets, and the Internet.

Further, local communication interface 430 may be used for establishing communications with other components in the log scaling system 100, such as may occur, for example, when the control system 400 may be used to communicate with the rear imagers 116, the forward imagers 118, the range finders 134, and/or the wireless transceiver 138.

Figure 5:
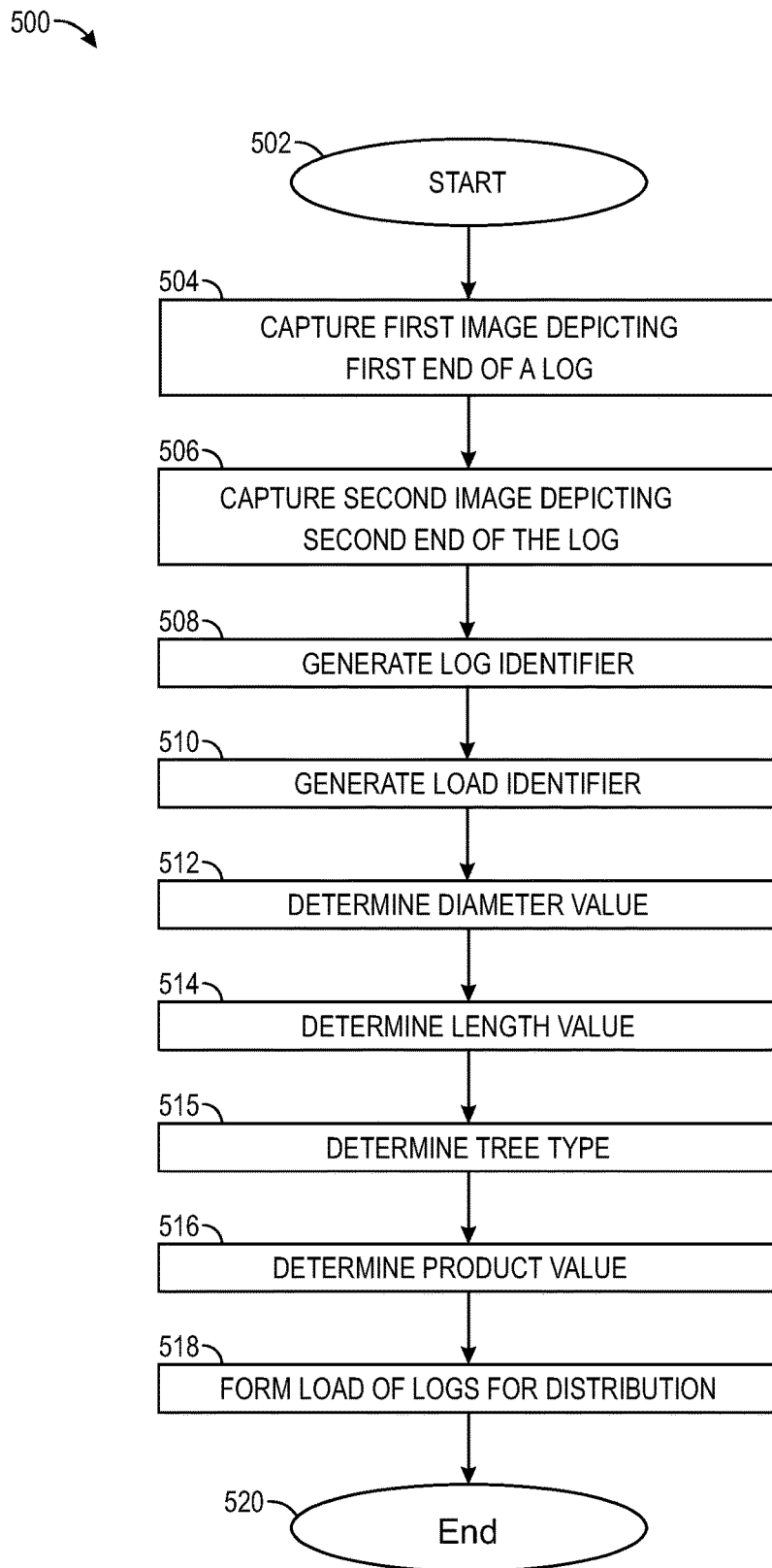
FIG. 5 is a flow diagram that illustrates scaling a plurality of logs loaded onto one or more transport trailers, according to at least one illustrated implementation.

FIG. 5 shows method 500 for scaling a plurality of logs loaded onto one or more transport trailers, according to at least one illustrated implementation. The method 500 starts at 502, at which a processor enabled device, for example the control system 400 is activated to scale one or more logs within a load 107 of logs 106. Such activation may occur, for example, automatically when a truck 102 and trailer 104 are positioned along the scale 101. Such activation may occur, for example, based a driver or other operator input (e.g., pressing a "Start" button) to initiate the method 500.

At 504, an imager, such as rear imagers 116a, 116b, may capture a first image depicting the first end 110 of one or more logs 106 being transported by a trailer 104. In some implementations, the first end 110 of the one or more logs 106 may be located distal from the truck 102 that is physically coupled to and pulling the trailer 104. The first image may be a digital image comprised of an array of pixels that are arranged within a plurality of rows and columns.

At 506, an imager, such as forward imagers 118a, 118b, may capture a second image depicting the second end 112 of one or more logs 106 being transported by the trailer 104. In some implementations, the second end 112 of the one or more logs 106 may be located proximate the truck 102 that is physically coupled to and pulling the trailer 104. The second image may be a digital image comprised of an array of pixels that are arranged within a plurality of rows and columns.

At 508, a processor-enabled device, such as control system 400, may generate a log identifier 434 for one or more logs 106. In some implementations, the log identifier 434 may uniquely identify each log 106. In some implementations, the log identifier 434 may uniquely identify each log 106 within a plurality of logs as compared to only the other logs within the plurality of logs. In some implementations, the log identifier 434 may be determined based upon information encoded or obtained from a log-based machine-readable symbol 318 that may be physically coupled or otherwise associated with the log 106.

At 510, a processor-enabled device, such as control system 400, may generate a load identifier 442 in which one or more logs 106 are associated as a load 107. The load identifier 442 may be used to identify a set of logs 106 (e.g., a load) that is being transported by a trailer, such as, for example, the logs 106 being transported by the trailer 104. The load identifier 442 may be determined based upon information encoded or obtained from one or more machine-readable symbols that may be physically coupled or otherwise associated with one or more logs 106, the trailer 104, and/or the truck 102. In some implementations, the load identifier 442 may be generated by the processor-enabled device using, for example, a random number or symbol generator. In some implementations, the load identifier 442 may be generated by the processor-enabled device sequentially or using some other defined method or system.

At 512, a processor-enable device, such as the control system 400, determines the diameter value 312 for one or more logs 106. In some implementations, the diameter value 312 for a log may be based upon the distance between opposing sides of the log 106 as shown in one or both of the first image captured in 504 depicting the first end 110 of the log 106 and the second image captured in 506 depicting the second end 112 of the log 106. In such implementations, for example, the distance between opposing sides of the first end 110 and/or the second end 112 of the log may be based on the number of pixels separating the opposing sides. In such implementations, each pixel may be associated with a defined distance, such that the distance between opposing sides may be determined by multiplying the number of pixels separating the opposing sides by the defined distance for each pixel.

In some implementations, the processor-enabled device may determine the diameter value 312 for a log 106 based upon additional determinations or measurements. For example, in some implementations, the processor-enabled device may adjust the diameter value 312 based upon bark component 316. As such, the processor-enabled device may identify an outer layer of bark for the log 106. In such an implementation, for example, the processor-enabled device may determine the distance between opposing sides of the log 106 inclusive of the bark component 316, as well as a bark-width value 326 for the bark component 316 of the log 106. As such, the processor-enabled device may deduct the bark-width value 326 from the distance between opposing sides of the log 106 to determine the diameter value 312. As another example, the processor-enabled device may determine the diameter value 312 based upon multiple measurements of distances between opposing sides, with each measurement taken at a different orientation. Such an implementation may be useful, for example, for logs 106 that are asymmetrically shaped. As such, the diameter value 312 may be based upon the greater or lesser of the plurality of distance measurements, upon the average or median of the plurality of distance measurements, or upon some other determination.

At 514, processor-enable device, such as the control system 400, determines the length value 438 for one or more logs 106. In some implementations, the length value 438 for a log 106 may be based upon a determined distance between the first end 110 and the second end 112 of the log. In some implementations, the distance for the length value 438 may be based upon an image that depicts an entire length 114 of the log 106 between the first end 110 and the second end 112. In some implementations, the distance for the length value 438 may be based upon a first location value associated with the first end 110 of the log 106, and upon a second location value associated with the second end 112 of the log 106. Such location values may be based, for example, upon the position of the first end 110 of the log 106 relative to the rear imagers 116, and/or upon the position of the second end 112 of the log 106 relative to the forward imagers 118. Such relative positions for the first end 110 and/or the second end 112 may be based upon the focal length of the respective imagers, as well as the positioning and orientation of the rear imagers 116 and the forward imagers 118 when capturing depictions of the first end 110 and/or the second end 112, respectively. The length value 438 may then be determined based upon the first location value for the first end 110 of the log 106 and upon the second location value for the second end 112 of the log 106.

At 516, a processor-enabled device, such as the control system 400, may determine a value, such as the product value 440 (e.g., board feet value 440), for a log 106. For example, the board-feet value 440 may be determined by multiplying the diameter value 312 of the log 106 by the length value 438 of the log 106 to determine a product value. The product value is then compared to entries in a board-feet chart to identify the corresponding board-feet value 440 for the log. In some implementations, the type of board-feet chart used to determine the board-feet value 440 may be based upon various criteria or considerations. For example, in some implementations, the board-feet chart may be based at least in part on the type of tree that comprises the log 106. Such a tree type may be included, for example, within the encoded information contained within the log-based machine-readable symbol 318. The processor-enabled device may determine additional and/or alternative values to associate with the log 106.

At 518, a processor-enabled device, such as the control system 400, may form a distribution load of logs 106 to be shipped or transported to a customer, for example. The distribution load of logs may be specified in a distribution record 432c and may be comprised, for example, of one or more logs 106. Each of the logs 106 in the distribution load of logs 106 may be identified by a log identifier 434. In some implementations, the distribution record 432c may be comprised of a plurality of log records 434a. In some implementations, the distribution record 432c may be comprised of a set of information that identifies specific logs 106, such as pointers to log records 434a and/or a list of log identifiers 434.

In some implementations, one or more distribution loads of logs 106 may be formed based upon an order received from a customer. For example, a customer may request a certain amount of product value (e.g., board-feet value) of lumber to be delivered within a set period of time. The processor-enabled device may aggregate logs 106 into a distribution load to meet the amount of board-feet requested by the customer. In some implementations, the processor-enabled device may take logs 106 from different loads 107 (e.g., loads 107 from different trailers) and form a distribution load of logs 106 to fulfill an order. In some implementations, the processor-enable device may be filling multiple requests for board-feet of lumber, potentially from different customers. In such an implementation, the processor-enabled device may form multiple distribution loads of logs 106, with each distribution load of logs 106 being associated with each order. In such an implementation, the processor-enabled device may use different criteria for forming the multiple distribution loads of logs 106. Such criteria may include, for example, forming a distribution load that most closely matches the board-feet of lumber requested by a particular client or clients. Such criteria may include, for example, forming the multiple distribution loads of logs 106 that provide a best fit for the board-feet of logs 106 requested in a plurality of orders.

At 520, the method 500 terminates, for example until invoked again. Alternatively, the method 500 may repeat continuously or repeatedly, or may execute as multiple instances of a multi-threaded process.

Figure 6:
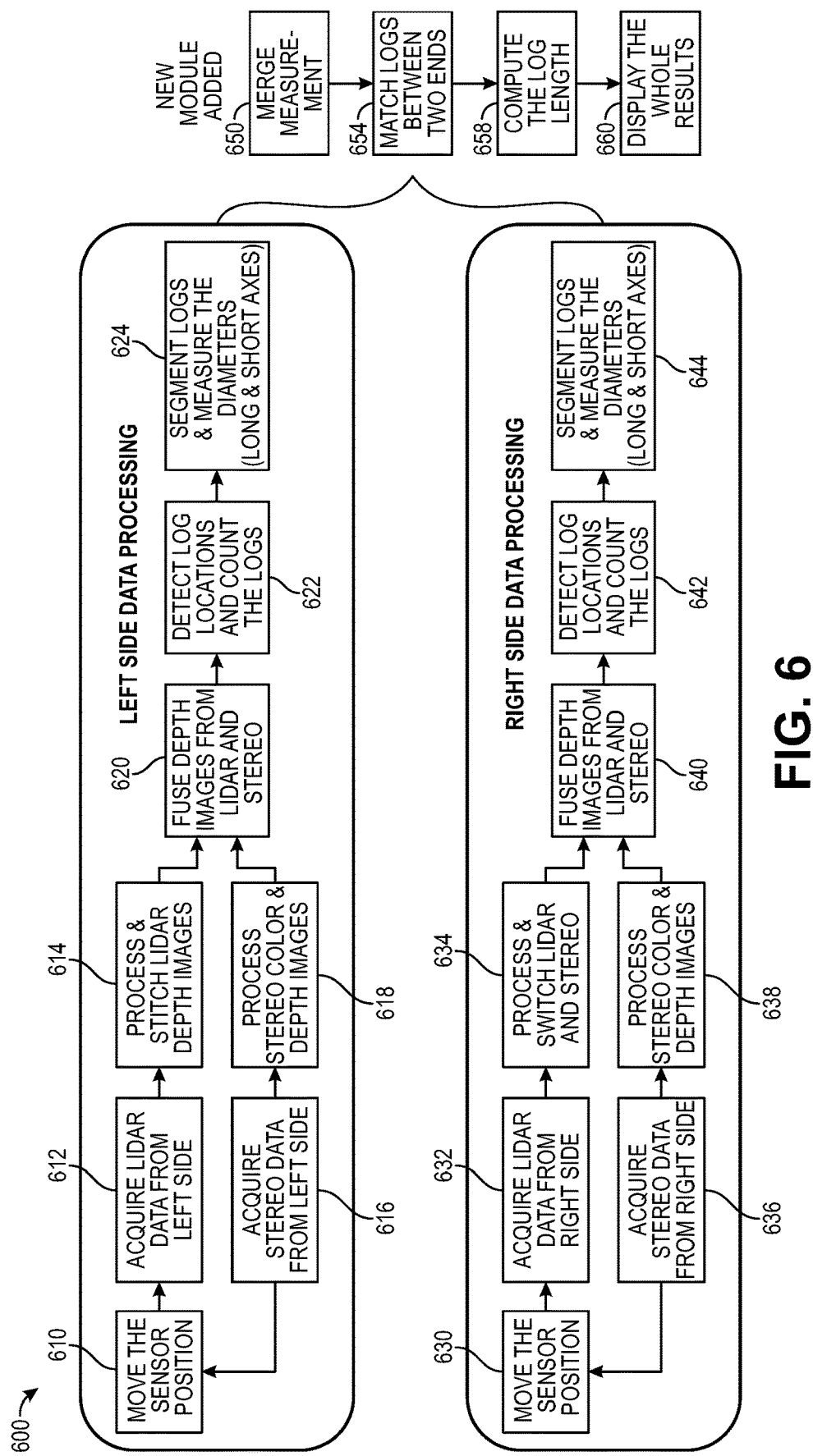
FIG. 6 is a flow diagram that illustrates scaling a plurality of logs loaded onto one or more transport trailers, according to at least one illustrated implementation.

FIG. 6 shows another method 600 for scaling a plurality of logs, according to at least one illustrated implementation. As described herein, the "left side" refers to a first end of the logs 106 and the "right side" refers to the other end of the logs 106. In this manner, the "left side" and "right side" of the logs 106 provide desirable placement to image the diameters of the logs 106. This method 600 employs a processor enabled device, for example the control system 400, which activates to scale one or more logs within a load 107 of logs 106. In one or more embodiments of this method, beginning with the left side data acquisition and processing, at 610, the left side sensor is moved into position to acquire log scaling data. Next, at 612, Lidar data from multiple Lidar images is acquired from the left side of the load 107 of logs 106. At 614, the Lidar data from multiple Lidar images on the left side is processed and stitched. Additionally, at 616, stereo data is acquired from the left side of the load 107 of logs 106. Next, at 618, the stereo color and depth images from the left side are processed.

The method 600 continues at 620, where depth images from both Lidar and stereo on the left side are fused together. At 622, log locations on the left side are detected and the log count is determined. Next, at 624, the load 107 of logs 106 is segmented and the diameters (e.g., long & short axes) of the logs 106 are measured on the left side. Notably, in other implementations of the log scaling system and method, other imaging and/or sensor techniques are used instead of or in addition to the Lidar and stereo methods described above.

Referring now to the right side data acquisition and processing, at 630, the right side sensor is moved into position to acquire log scaling data. Notably, in some embodiments, the left side sensor and the right side sensor are both placed prior to measurements and images being acquired. In other embodiments, the measurements and images being acquired from the left side and right side occur sequentially. In embodiments where the measurements and images being acquired from the left side and right side occur sequentially, the left side sensor and the right side sensor may be the same sensor. Next, at 632, Lidar data from multiple Lidar images is acquired from the right side of the load 107 of logs 106. At 634, the Lidar data from multiple Lidar images on the right side is processed and stitched. Additionally, at 636, stereo data is acquired from the right side of the load 107 of logs 106. Next, at 638, the stereo color and depth images from the right side are processed.

The method 600 continues at 640, where depth images from both Lidar and stereo on the right side are fused together. At 622, log locations on the right side are detected and the log count is determined. Next, at 624, the load 107 of logs 106 is segmented and the diameters (e.g., long & short axes) of the logs 106 are measured on the right side.

At 650, the method includes merging measurement from the left side sensor and the right side sensor. At 654, the method includes matching the logs 106 between the left side end and the right side end. At 658, the method includes computing the length of the logs 106. Finally, at 660, the method includes displaying the results of the log scaling data acquisition and analysis.

At least some of the equipment discussed in the present disclosure comprises hardware and associated software. For example, the typical electronic device is likely to include one or more processors and software executable on those processors to carry out the operations described. The term software is used herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present disclosure may include executable programs or instructions that are stored in machine-readable or computer-readable storage media, such as a digital memory. No implication is made that a "computer" in the conventional sense is required in any particular embodiment. For example, various processors, embedded or otherwise, may be used in equipment such as the components described herein.

In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, and the like, such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized herein, may be used to make a software product. That said, it is also known that software can be distributed via electronic transmission ("download"), in which case there typically will be a corresponding software product at the transmitting end of the transmission, or the receiving end, or both.

The various embodiments described above may be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

The invention claimed is:

1. A log scaling system to scale a plurality of logs that are arranged within a transport trailer, each log within the plurality of logs including a first end and a second end separated by a length of the log, the system comprising:
   a first sensor that captures a first image of the first end of a log in the plurality of logs;
   a first range finder that determines a first distance between the first range finder and the first end of the log in the plurality of logs;
   a second range finder that determines a second distance between the second range finder and the second end of the log in the plurality of logs, wherein a relative distance is determined between relative positions of the first range finder and the second;
   a processor-enabled controller that is communicatively coupled to the first sensor, the first range finder, and the second range finder, wherein the processor-enabled controller determines the length of the log using the first distance, the second distance, and the relative distance;
   wherein the processor-enabled controller further determines a diameter value for the log based upon the first image of the first end of the log in the plurality of logs and the distance between the first range finder and the first end of the log in the plurality of logs; and
   wherein the processor-enabled controller determines, based at least in part upon the diameter value, a product value for the log, the product value being determined using the log length and the diameter value for the log.

2. The log scaling system of claim 1, further comprising: a second sensor that captures a second image, wherein the second image depicts the second end of the log in the plurality of logs, and wherein the first sensor and second sensor are 3D sensors.

3. The log scaling system of claim 1, the first sensor is mounted on a motorized slider system that positions the first sensor with respect to the log.

4. The log scaling system of claim 3, wherein the motorized slider system enables the first sensor to be moved vertically and horizontally around the log.

5. The log scaling system of claim 1, further comprising: a wireless receiver that receives a signal transmitted from a wireless transmitter that is physically coupled to the log, wherein the transmitted signal encodes a first identifier for the log, wherein the processor-enabled controller stores a first data record that includes the first identifier and the determined product value for the log in a storage device.

6. The log scaling system of claim 1, wherein the processor-enabled controller determines tree-type information related to the log from one or more of the first and second images, the tree-type information identifying one out of a plurality of types of trees, wherein determining the product value for the log is further based upon the tree-type information.

7. A log scaling system to scale a plurality of logs, each log within the plurality of logs including a first end and a second end separated by a length of the log, the system comprising:
   one or more sensors that capture a first image of the first end of the log in the plurality of logs, wherein tree-type information related to the log is determined from the one or more sensors, the tree-type information identifying one out of a plurality of types of trees;
   a first range finder that determines a first distance between the first range finder and the first end of the log in the plurality of logs; and a second range finder that determines a second distance between the second range finder and the second end of the log in the plurality of logs, wherein a relative distance is determined between relative positions of the first range finder and the second;

a processor-enabled controller that is communicatively coupled to the one or more sensors, the first range finder, and the second range finder, wherein the processor-enabled controller determines the length of the log using the first distance, the second distance, and the relative distance;

wherein the processor-enabled controller further determines a diameter value for the log based upon the first image of the first end of the log in the plurality of logs and the range between the first range finder and the first end of the log in the plurality of logs;

wherein the processor-enabled controller determines a product value for the log, the product value being determined using a log length, the diameter value for the log, and the tree-type information.

8. The log scaling system of claim 7, further comprising: a second imager that captures a second image, the second image which depicts the second end of the log in the plurality of logs.

9. The log scaling system of claim 7, wherein the one or more sensors are positioned on a motorized slider system that positions the one or more sensors with respect to the log.

10. The log scaling system of claim 8, wherein the motorized slider system enables the sensor to be moved vertically and horizontally around the log.

11. The log scaling system of claim 8, wherein data from the first image depicting the first end of log in the plurality of logs and data from the second image depicting the second end of the log in the plurality of logs is used to detect log locations and determine a count of the logs.

12. The log scaling system of claim 8, wherein data from the first image depicting the first end of the log in the plurality of logs and data from the second image depicting the second end of the log in the plurality of logs is used to segment logs and measure the diameters of the logs.

13. The log scaling system of claim 8, wherein data from the first image depicting the first end of the log in the plurality of logs and data from the second image depicting the second end of the log in the plurality of logs is used to match two ends of each log.

14. A log scaling method to scale a plurality of logs, each log within the plurality of logs including a first end and a second end separated by a length of the log, the method comprising:

capturing at least a first image, using one or more sensor systems, of the first end of the log in the plurality of logs, the one or more sensor systems each including one or more sensors and one or more processors;

determining, using a first range finder, a first distance between the first range finder and the first end of the log in the plurality of logs;

determining, using a second range finder, a second distance between the second range finder and the second end of the log in the plurality of logs;

determining, using a processor-enabled controller that is communicatively coupled to the one or more sensors, the first range finder, and the second range finder, a relative distance between relative positions of the first range finder and the second;

calculating, using the processor-enabled controller, the length of the log using the first distance, the second distance, and the relative distance;

calculating, using the processor-enabled controller, a diameter value for the log based upon the image of the first end of the log and distance determined between the first range finder and the first end of the log; and calculating, using the processor-enabled controller, a product value for the log, the product value being determined using the log length and the diameter value.

15. The log scaling method of claim 14, wherein the one or more sensor systems comprise at least a first end sensor and a second end sensor, the second end sensor capturing a second image that depicts the second end of the log in the plurality of logs.

16. The log scaling method of claim 14, wherein the one or more sensors are positioned on a motorized slider system that positions the one or more sensors with respect to the log.

17. The log scaling method of claim 15, further comprising detecting log locations and determining a count of the logs using data from the first image depicting the first end of the log in the plurality of logs and data from the second image depicting the second end of log in the plurality of logs.

18. The log scaling method of claim 15, further comprising segmenting logs and measuring the diameters of the logs using data from the first image depicting the first end of the log in the plurality of logs and data from a second image depicting the second end of the log in the plurality of logs.

19. The log scaling method of claim 15, further comprising matching two ends of each log using data from the first image depicting the first end of the log in the plurality of logs and data from the second image depicting the second end of the log in the plurality of logs.

20. The log scaling method of claim 15, further comprising:

determining tree-type information related to the log from one or more of the first and second images, the tree-type information identifying one out of a plurality of types of trees, wherein determining the product value for the log is further based upon the tree-type information.

\* \* \* \* \*